United States Patent [19]

Phillips et al.

[11] Patent Number: 4,955,083
[45] Date of Patent: Sep. 4, 1990

[54] DUAL MODE RADIO TRANSCEIVER FOR AN SSB COMMUNICATION SYSTEM

[75] Inventors: Sharon E. T. Phillips, Lake In The Hills; Bruce C. Eastmond, Downers Grove, both of Ill.

[73] Assignee: Motorola, Inc., Schaumburg, Ill.

[21] Appl. No.: 434,562

[22] Filed: Nov. 13, 1989

Related U.S. Application Data

[63] Continuation of Ser. No. 926,285, Oct. 10, 1986, abandoned.

[51] Int. Cl.$^5$ ........................... H04B 1/68; H04B 1/02
[52] U.S. Cl. ...................................... 455/47; 455/102; 455/103; 455/703; 375/43; 375/77
[58] Field of Search .................. 455/46, 47, 71, 202, 455/305, 306, 234, 197, 200, 102, 78, 179, 177, 103, 203, 205; 375/38, 41, 42, 44–47, 5, 77–79, 97, 88, 89, 98, 61, 50; 370/11

[56] References Cited

U.S. PATENT DOCUMENTS

| | | | |
|---|---|---|---|
| 2,709,254 | 5/1955 | Halstead | 343/200 |
| 3,100,871 | 8/1966 | Richardson et al. | 325/330 |
| 3,271,681 | 9/1966 | McNair | 325/25 |
| 3,492,429 | 1/1970 | Schroeder | 179/15 |
| 3,586,781 | 6/1971 | Jones | 179/15 |
| 3,845,391 | 10/1974 | Crosby | 325/64 |
| 3,875,339 | 4/1975 | Gruen et al. | 179/15 FD |
| 3,955,142 | 5/1976 | Frank et al. | 455/47 |
| 3,987,374 | 10/1976 | Jones, Jr. | 370/11 |
| 4,009,442 | 2/1977 | Von Bromssen | 325/470 |
| 4,012,597 | 3/1977 | Lynk, Jr. | 179/41 |
| 4,131,849 | 12/1978 | Freeburg et al. | 325/54 |
| 4,238,849 | 12/1980 | Gassmann | 370/11 |
| 4,252,995 | 2/1981 | Schmidt et al. | 179/1 GD |
| 4,280,020 | 7/1981 | Schnurr | 455/102 |
| 4,313,211 | 1/1982 | Leland | 455/139 |
| 4,348,772 | 9/1982 | Leland et al. | 455/260 |
| 4,384,362 | 5/1983 | Leland | 455/33 |
| 4,387,351 | 6/1983 | Furiga et al. | 332/19 |
| 4,424,593 | 1/1984 | Kahn | 455/47 |
| 4,512,013 | 4/1985 | Nash et al. | 370/69.1 |
| 4,539,707 | 9/1985 | Jacobs et al. | 455/47 |
| 4,541,118 | 9/1985 | Eastmond et al. | 455/35 |
| 4,556,973 | 12/1985 | Uemura | 370/69.1 |
| 4,573,026 | 2/1986 | Curtis et al. | 332/18 |
| 4,596,046 | 6/1986 | Richardson et al. | 455/260 |
| 4,658,437 | 4/1987 | Ersoz et al. | 455/197 |
| 4,660,192 | 4/1987 | Pomatto, Sr. | 455/102 |
| 4,680,749 | 7/1987 | Englund et al. | 370/11 |
| 4,704,715 | 11/1987 | Shibagaki et al. | 370/50 |
| 4,709,406 | 11/1987 | Omoto | 455/182 |
| 4,715,001 | 12/1987 | Deem et al. | 455/182 |
| 4,726,069 | 2/1988 | Stevenson | 455/47 |

FOREIGN PATENT DOCUMENTS 58-151737(A) 9/1983 Japan.

OTHER PUBLICATIONS

Bateman, Andrew J. et al., "Speech and Data Communications over 942 MHz TAB and TTIB Single Sideband Mobile Radio Systems Incorporating Feed-Forward Signal Regeneration", IEEE Transactions on Vehicular Technology, vol. VT-34, No. 1, Feb. 1985, pp. 13-21.

(List continued on next page.)

Primary Examiner—Reinhard J. Eisenzopf
Assistant Examiner—Curtis A. Kuntz
Attorney, Agent, or Firm—Joseph P. Krause; Steven G. Parmelee; Anthony J. Sarli

[57] ABSTRACT

A radio transceiver is disclosed for use in an SSB communication system having FM data capability. The dual-mode radio transceiver of the present invention includes a receiver capable of demodulating and deriving AFC from either (a) the voice channel having voice messages transmitted via single sideband amplitude modulation with a pilot carrier, or (b) the data channel having high speed data messages transmitted via narrowband frequency modulation in the same channel bandwidth. Furthermore, the dual-mode radio transceiver includes a transmitter capable of transmitting one of either of the above types of modulation on the appropriate channel, as determined by information received from the high speed data messages transmitted on the control channel.

40 Claims, 7 Drawing Sheets

OTHER PUBLICATIONS

Bishop, Don, "Air/Ground Phone System Uses Compatible Single Sideband", Mobile Radio Technology, Jul. 1985, pp. 48–54.

Carney, Scott et al., "A Digital Mobile Radio for 5–6 Kilohertz Channels", IEEE International Conference on Communications, Jun. 13–17, 1982, pp. 5B.3.1–5B.3.6.

Gibson, R. W., "Land Mobile SSB: Promises and Problems", 31st IEEE Conference on Vehicular Technology, Apr. 1981, pp. 28/1–28/5.

Gibson, E. W. et al., "The Potential of SSB for Land-/Mobile Radio", 29th IEEE Vehicular Technology Conference, Mar. 1979, pp. 90–94.

Jacobs, Paul H., "Improving Spectrum Efficiency with ACSB", Communications Magazine, Mar. 1981, pp. 34–44.

Kadokawa, Yasuo et al., "SSB Lincompex Transmitter and Receiver for Land Mobile Communication", Proceedings 31st IEEE Vehicular Technical Conference, 1981, pp. 149–154.

Markle, R. E., "The AR 6A Single Sideband Long Haul Radio System", IEEE International Conference on Communications, 1977, pp. 78–82.

McGeehan, Joseph P. et al., "Elimination of False-Locking in Long Loop Phase-Locked Receivers", IEEE Transaction on Communication, vol. Com–30, No. 10, Oct. 1982, pp. 2391–2397.

McGeehan, J. P. et al., "Phase-Locked Transparent Tone-in-Band (TTTB): A New Spectrum Configuration Particularly Suited to the Transmission of Data Over SSB Mobile Radio Networks", IEEE Transactions on Communications, vol. Com–30, No. 10, Jan. 1984, pp. 81–87.

McGeehan, J. P. et al., "Problem of Speech Pulling and Its Implications for the Design of Phase-Locked SSB Radio Systems", IEEE Proceedings, vol. 128, No. 6., pp. 361–369, Nov. 1981.

Thro, Stuart, "Trunking: A New System Configuration for Fleet Dispatch Communications", 29th Vehicular Technology Conference, Mar. 27–30, 1979, pp. 302–306.

Wells, R., "The Application of Single Side Band Modulation in the 450 MHZ and 960 MHZ Land Mobile Radio Bands", International Conference on Land Mobile Radio, Sep. 1979, pp. 291–298.

Wells, R., "SSB for VHF Mobile Radio at 5 kHz Channel Spacing", Proceedings of IERE Conference Radio Receivers and Associated Systems, Jul. 1978, Philips Research Laboratories, Redhill, Surrey, U.K., pp. 29–36.

"Amplitude and FM Modulation System," SALZ, pp. 1, 10/79, PCT #WO0000718.

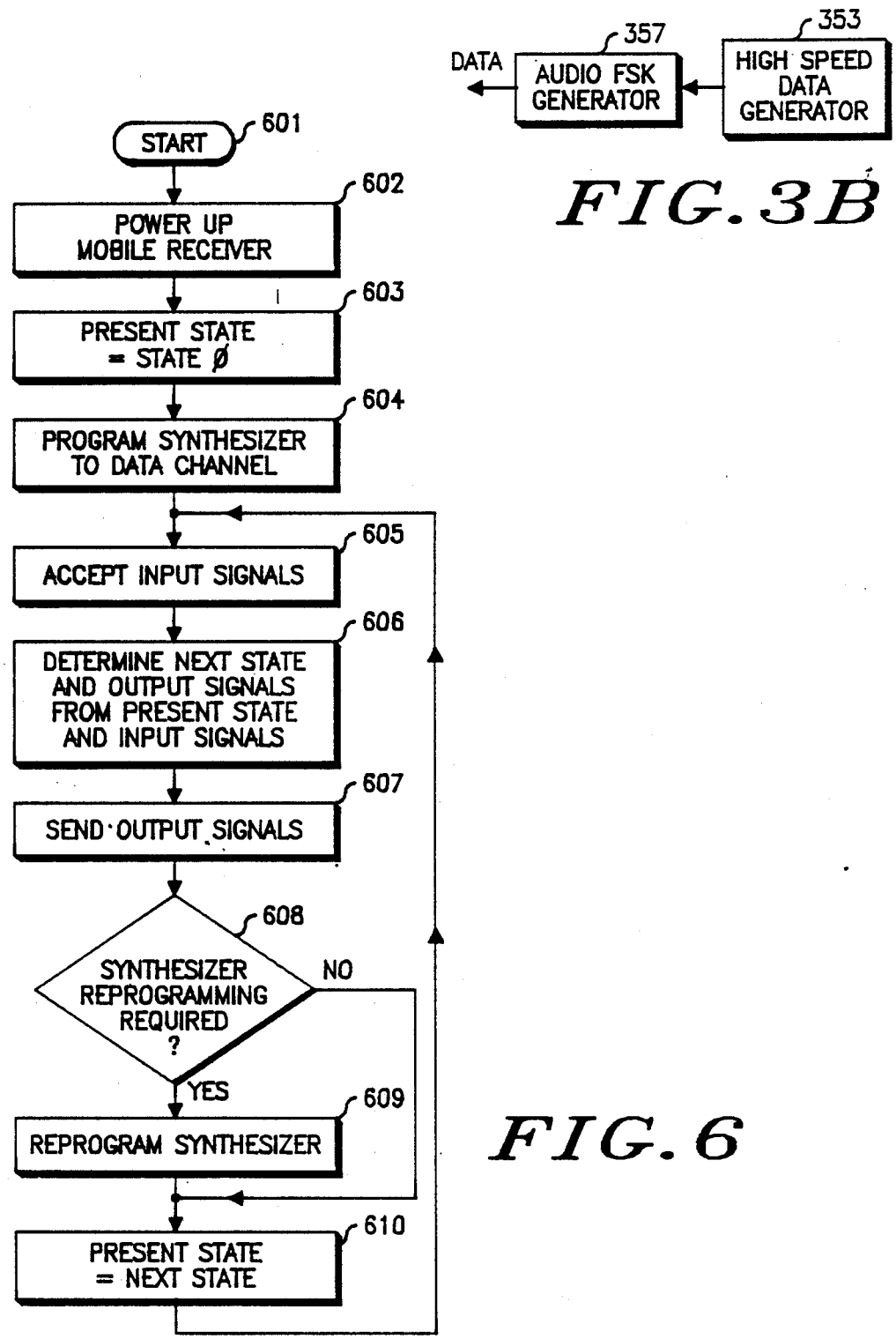

DUAL MODE RADIO TRANSCEIVER FOR AN SSB COMMUNICATION SYSTEM

This is a continuation of application Ser. No. 06/926,285 filed Oct. 10, 1986 and now abandoned.

CROSS-REFERENCE TO RELATED APPLICATION

This application contains subject matter related to co-pending applications Ser. No. 06/926,022 and Ser. No. 06/925,638, both filed Oct. 31, 1986, and both assigned to the same Assignee as the present application.

BACKGROUND OF THE INVENTION

1. Field of the Invention

The present invention generally relates to single sideband radio communications systems. More specifically, the present invention relates to a technique for transmitting analog voice signals via single sideband amplitude modulation, and digital data signals via narrowband frequency modulation, in a single trunked radio system having dedicated channel bandwidths.

2. Description of the Prior Art

In recent years, there has been a renewed interest in the research and development of a variety of narrowband communication systems. This effort has been stimulated by the severe spectrum congestion being experienced by the land mobile radio services in major metropolitan areas with the present amplitude modulation (AM) and frequency modulation (FM) systems. In the United States, 25 or 30 kHz FM systems are used throughout the VHF (very high frequency) and UHF (ultrahigh frequency) bands, while in other countries, including Great Britain, channel spacings of 12.5 kHz are also used. A further reduction in channel spacing to less than 12.5 kHz is considered necessary if future demands for spectrum are to be satisfied.

Digital voice transmission which employs linear predictive coding (LPC) and single sideband (SSB) have emerged as potential solutions to the problem of increasing spectrum congestion. For example, Carney and Linder, in their article entitled, "A Digital Mobile Radio for 5–6 kHz Channels", *IEEE International Conference on Communications,* Philadelphia, Pa., June 13-17, 1982, describe a 2400 bits-per-second (bps) LPC voice encoding technique for VHF-FM land mobile radios. Bit rate reduction is realized with LPC by removing redundancy through complex speech analysis and synthesis. Decreasing the high frequency content of the data, while lengthening the duration of the bit transitions, reduces the baseband data bandwidth such that a channel spacing of 5 to 6.25 kHz is feasible. However, there is a noticeable degradation in speech quality attributable to the speech encoding technique.

It has been known for many years that single sideband modulation has the advantage of a reduction in occupied bandwidth over FM systems or standard AM systems. SSB is, in reality, amplitude modulation with a carrier and one of the two sidebands suppressed, utilizing only one sideband to convey information from the transmitter to the receiver. The receiver, to demodulate the SSB signal, must recreate the suppressed carrier with the same frequency relationship to the single sideband as that of the original carrier in order to prevent distortion of the demodulated information. Voice information will sound severely distorted if the frequency error is much greater than ±20 Hz. Furthermore, a variation in RF signal strength due to propagation conditions results in a corresponding variation in the detected audio level of the SSB signal. This causes a severe degradation of voice intelligibility.

If, however, a pilot signal is transmitted continuously with the single sideband message, and used by the receiver to track and eliminate any frequency variation imposed by fading, no frequency shift will occur in the demodulated signal. Furthermore, if the pilot signal is also used as an amplitude reference signal to automatically control the receiver gain, a constant received audio signal level may be maintained.

Numerous possibilities exist for the location of the pilot signal. The generation of a pilot carrier may simply be done by providing a controlled leakage path around the transmitter sideband filter, as described in U.S. Pat. No. 3,100,871. There, a pilot carrier signal is simultaneously transmitted with the SSB voice signal. The pilot carrier is detected by a phase locked loop, and also provides a reference signal for the operation of squelch circuitry.

An alternate SSB system approach is described in the article entitled, "Improving Spectrum Efficiency with ACSB", *Communications,* March 1981, by P. H. Jacobs. This VHF-SSB system utilizes a pilot tone transmitted above the voice band to provide a frequency reference for automatic frequency control (AFC), an amplitude reference for automatic gain control (AGC), and an audio subcarrier for low deviation FM tone squelch information. Syllabic amplitude companding improves the signal-to-noise ratio of the voice. Several problems remain with this approach. First, the sidebands of a digital data signal transmitted within the voice band may cause problems with frequency acquisition, since the above-band pilot tone is used as the AFC reference and must be transmitted with the data. Second, the narrow phase locked loop (PLL) required to demodulate the FM tone squelch information cannot follow the very rapid amplitude and frequency variations imposed upon a signal received in a moving vehicle. For example, multipath propagation at UHF causes fading which occurs at a rate of approximately 70 Hz at 840 MHz with a vehicle speed of 55 mi/hr. These amplitude and frequency variations cause severe distortion in the received speech signal as a consequence of the poor PLL tracking behavior.

A further problem with respect to 800 MHz radio systems is that of frequency stability. At 800 MHz, the 2 ppm (part-per-million) channel oscillators presently used in mobile radios could permit two adjacent channel mobile transmitters to drift together in frequency by as much as 3.5 kHz. With 5 or 6.25 kHz channel spacings, this much frequency error would result in a degradation in adjacent channel interference that would be intolerable. Unless very costly ultra-high stability (0.15 ppm) oscillators are utilized, adjacent narrowband channels nominally spaced 5 or 6.25 kHz apart cannot be assigned in the same area without incurring a strong likelihood of mutual interference. One solution is to abandon single channel systems in favor of structured repeater systems which afford the opportunity to impart the high frequency stability requirement of the base station to the mobile unit through the use of AFC. If the repeater incorporates multiple trunked channels, then a further improvement in spectrum utilization would be achieved. It is assumed that both voice and data must be communicated in such a trunked system, since the organization of the system is directed by data transmissions on a signalling channel.

Trunking is the automatic sharing of a block of communications channels among a large number of users. Such sharing is practical for applications in which each user requires the communications channel for only a small percentage of the time, and where few calls must be processed simultaneously. Although trunking concepts have been known and used extensively in the telephone industry and in 800 MHz FM radio systems, e.g., U.S. Pat. No. 4,012,597, little work has been done utilizing SSB trunking at 800 MHz because of the frequency stability problems referred to above. Prior communications systems requiring AFC have employed an unmodulated master reference channel having a channel bandwidth of at least twice the bandwidth of a regular voice channel, e.g., U.S. Pat. No. 4,348,772. This approach would allow ample free spectrum space for a newly activated mobile unit to search for, find, and lock to the master reference frequency. However, the utilization of this wideband reference channel approach contradicts the aforementioned goal of efficient spectrum utilization.

It is believed that there presently are no multichannel narrowband (5-6.25 KHz) UHF radio systems, AM or FM, that efficiently send and receive both analog voice and digital data signals within a dedicated single channel bandwidth. The ideal system would offer substantially the same level of performance currently enjoyed by existing FM systems—that is: high quality voice transmissions, high speed data signalling capabilities, and standard 2 ppm channel oscillator stability in the transceiver unit—while improving the spectrum efficiency with narrowband channels in the 800 MHz frequency band.

SUMMARY OF THE INVENTION

Accordingly, a general object of the present invention is to provide a method and means for more efficient use of the 800 MHz land mobile radio spectrum through the use of an improved multichannel narrowband communications system.

Another object of the present invention is to provide a narrowband trunked repeater radio system operating at 800 MHz in which both analog voice and digital data signals are communicated within a dedicated single narrowband channel bandwidth.

A further object of the present invention is to provide a radio communications system allowing for the use of standard 2 ppm channel elements in the mobiles, while only requiring a single very high stability oscillator in the base station.

Still another object of the present invention is to provide a dual-mode mobile radio transceiver having receive circuitry that can demodulate—and derive AFC from—either digital FM or analog SSB modulation.

Yet another object of the present invention is to provide a mobile radio controller capable of remembering the present state of the transceiver, accepting input signals derived from the received narrowband FM data on one channel, determining the proper next state of the transceiver, and outputting the proper control signals to instruct the radio to receive SSB-AM voice signals on another channel.

These and other objects are achieved by the present invention which, briefly described, is a single sideband communications system having voice transmissions sent via single sideband amplitude modulation utilizing a pilot carrier as an AFC and AGC reference, and having digital data signals sent via narrowband frequency modulation of a radio frequency carrier confined to a channel having a same bandwidth as the voice SSB modulation. The system's base station utilizes a very high stability reference oscillator, while the remote units utilize a reference oscillator of moderate stability with AFC. The AFC initially acquires lock to the FM data channel carrier which is then demodulated to determine the frequency of a second channel, which has the same bandwidth as the data channel and is used for subsequent voice communication. The AFC then acquires lock on the single sideband pilot carrier on the voice channel. The controller incorporates a memory state for holding AFC for the mobile transmit frequency.

In the preferred embodiment, the data channel incorporates 2400 bits-per-second (bps) frequency shift keying (FSK) FM data as the signalling format having 800 Hz deviation in a 6.25 kHz channel bandwidth. The voice channel includes a reduced pilot carrier located below the voice band for AFC and AGC reference, and an audio subcarrier located above the voice band having low speed data frequency modulation at approximately 80 Hz deviation within the same 6.25 kHz channel bandwidth. Utilizing this scheme, the mobile radio receivers have improved amplitude and frequency fading performance at 800 MHz. Hence, the communication system of the present invention provides a narrowband high speed data channel containing trunked system information sent at full peak envelope power (PEP) without a pilot carrier, and a single sideband voice channel having a pilot carrier and a low speed data subcarrier.

The dual-mode radio transceiver of the present invention includes a receiver capable of demodulating and deriving AFC from either (a) the voice channel having voice messages transmitted via single sideband amplitude modulation with a pilot carrier, or (b) the data channel having high speed data messages transmitted via narrowband frequency modulation in the same channel bandwidth. Furthermore, the dual-mode radio transceiver includes a transmitter capable of transmitting one of either of the above types of modulation on the appropriate channel, as determined by information received from the high speed data messages transmitted on the control channel.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like referenced numerals identify like elements and in which:

FIG. 3b is a block diagram of an alternate implementation for high speed data modulation in the transmitter block of FIG. 3a;

FIG. 6 is a simplified flowchart diagram illustrating the general, sequence of operations performed by the mobile radio controller in accordance with the practice of the invention.

DETAILED DESCRIPTION OF THE INVENTION

Figure 1:
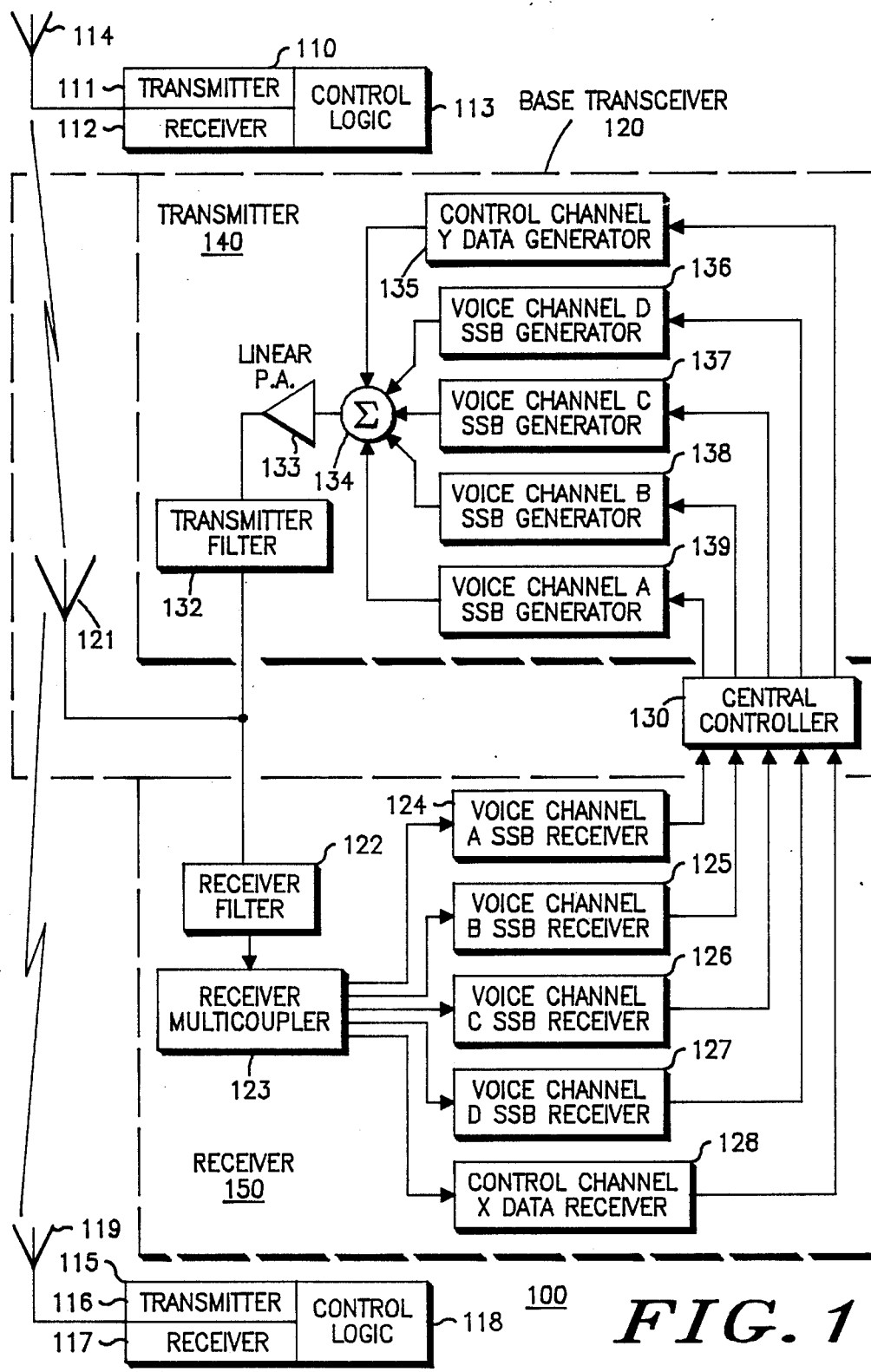
FIG. 1 is a block diagram of the single sideband communication system according to the present invention.
Figure 2:
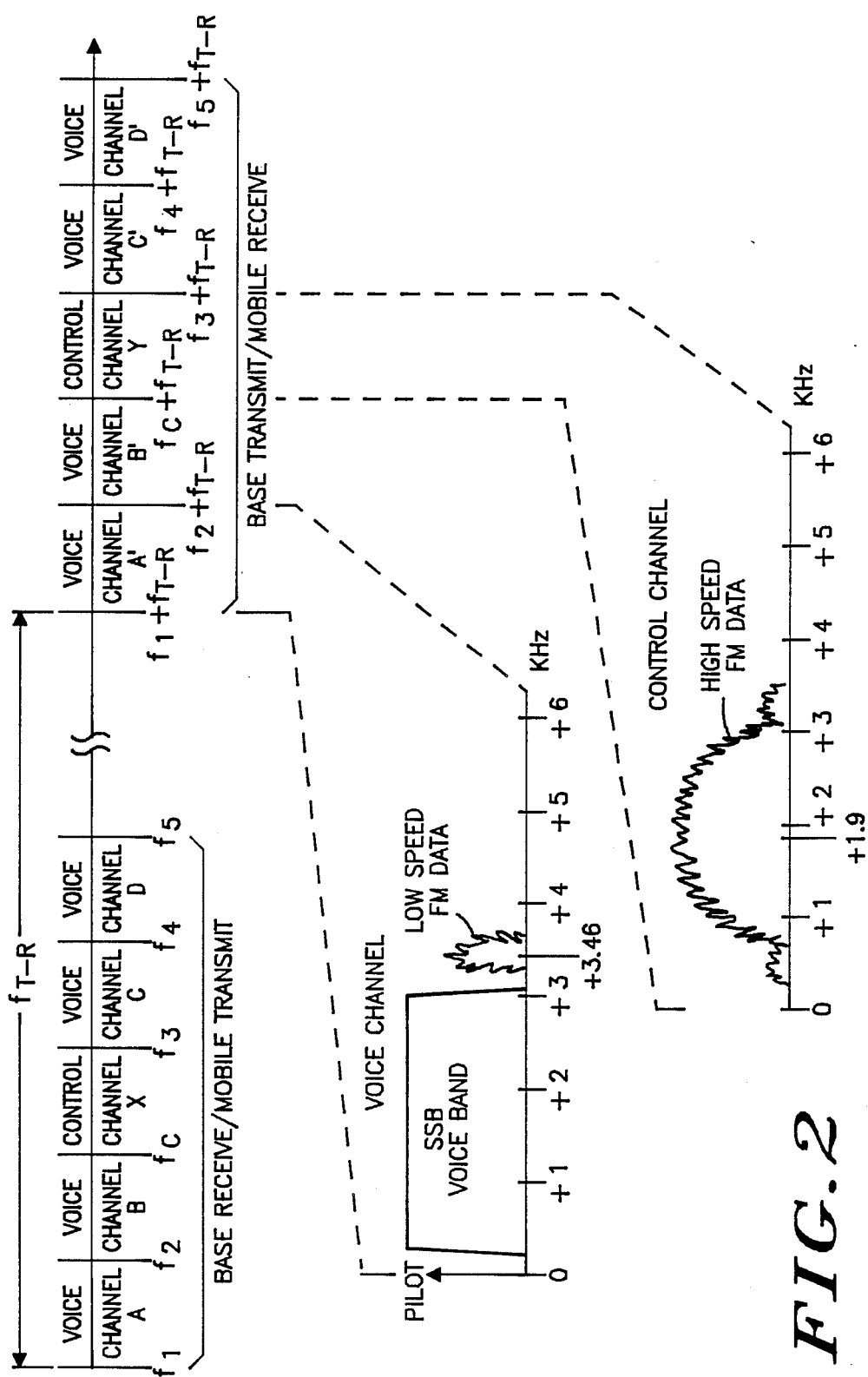
FIG. 2 is a frequency spectrum diagram of the communication system of FIG. 1 illustrating the modulation of a particular voice channel and control channel according to the present invention.

The preferred embodiment of the invention is a communication system including both SSB voice and FM data channels in a trunked radio system. An overall system block diagram is illustrated in FIG. 1. The frequency spectrum and channel relationships of the communications system are illustrated in FIG. 2. The basic system configuration of FIG. 1 is most efficiently implemented in a trunked single sideband system having groups of transmit/receive paired voice channels, narrowband channel spacings (i.e., less than or equal to 7.5 kHz at 800 MHz), a single base station transceiver 120, and identical multi-frequency mobile transceivers 110 and 115.

Mobile transceiver 110 includes transmitter 111, and receiver 112. Control logic 113 controls the mobile radio operation as to frequency, synthesizer programming, AFC operation, signalling data decoding, etc. Antenna 114 is coupled to both transmitter 111 and receiver 112. In the preferred embodiment, the mobile transceiver is designed for two-frequency simplex operation on a single trunked radio channel pair; although duplex operation is readily feasible if the number of channel pairs per call is doubled. The mobile transceiver is capable of transmitting over frequency range $F_1$ through $F_5$ and capable of receiving over a frequency range $F_1+F_{T-R}$ through $F_5+F_{T-R}$. $F_{T-R}$ is the transmit/receive frequency spacing. Accordingly, base station 120 receives frequencies $F_1-F_5$ and transmits frequencies $F_1+F_{T-R}$ through $F_5+F_{T-R}$.

Base station transceiver 120 is comprised of central controller 130, base transmitter 140, base receiver 150, and base antenna 121. Central controller 130 controls the channel assignments for the system. Initially, no voice messages are in progress and all mobile units are assigned to receive system control channel Y by monitoring the continuous stream of outbound data. To place a call, a mobile transceiver transmits a packet of data over control channel X containing the identity of both the called and the calling mobile unit. This service request is received and processed by the central controller. The central controller validates the service request, reviews the status of its voice channels, and responds with a channel assignment to the requesting mobile (or perhaps, with a busy acknowledgment if all voice channels are occupied) on control channel Y.

For example, assume that mobile transceiver 110 initiates a call. Transmitter 111 will send high speed data on data channel X to the base station. When the call request is received at base station antenna 121, the received signal is bandpass filtered by receive filter 122, and coupled to control channel X data receiver 128 via receiver multicoupler 123. Upon receiving this service request, central controller 130 instructs control channel Y data generator 135 to output a channel assignment to mobile 110 via transmitter coupler 134, linear power amplifier 133, transmitter filter 132, to base antenna 121. Central controller 130 also sends out a channel assignment to mobile transceiver 115 for either the same voice channel as mobile transceiver 110 (i.e., voice channel A) in a simplex system, or for a different voice channel (i.e., voice channel C) for a duplex system. The outbound FM signalling words are generated by control channel Y data generator 135, and transmitted on control channel Y at frequent intervals.

Upon receipt of the outbound signalling data word on data channel Y, mobile transceiver control logic 113 will immediately switch transmitter 111 to voice channel A and receiver 112 to voice channel A'. As an additional precautionary step to insure voice channel privacy, mobile 110 will validate the channel assignment on voice channel A by transmitting subaudible signalling data continuously for the duration of the message. This would function both as a connect indication to the central controller, and as an audio squelch control signal used by the base. Furthermore, control logic 118 of mobile radio transceiver 115 switches transmitter 116 to the appropriate voice channel (A or C). Central controller 130 then instructs the base transceiver to operate as a repeater station, utilizing voice channel A receiver 124 to receive transmissions from mobile 110, and patching the audio through to the appropriate voice transmit channel (A' or C'). SSB voice is then transmitted via the appropriate SSB generator (139 or 137) to mobile transceiver 115.

FIG. 2 illustrates the frequency relationships between the transmitted and received voice and data channels. In the preferred embodiment, as many as five channels—four voice and one data—are multiplexed into each channel group. The T/R channel groups are separated by the transmit/receive frequency spacing $F_{T-R}$. Wide frequency separation is necessary to minimize the complexity of filters 122 and 132 and their counterparts in the mobile transceiver units. In the preferred embodiment, wherein $F_1$ equals 825 MHz, a typical transmit/receive spacing $F_{T-R}$ would be 45 MHz.

Utilizing four SSB voice channels and one FM data channel, the communication system of the present invention provides the features and performance of an FM trunked system while only occupying one-fourth of the frequency spectrum. Three SSB channels may be combined in a common power amplifier and can be placed within one 25 kHz channel assignment with minimal interference either to or from existing adjacent FM channels. It is believed that five channels represent a reasonable upper boundary to the number of channels that can be combined. Cavity combiners are not required at the base site if five channels or less are to be combined. For a standard 20 channel trunked system only four transmitter cavities would be required.

It is likely that 6.25 kHz rather than 5 kHz channel bandwidths will emerge as a standard for narrowband systems in the 800 MHz band. The wider channel spacing will ease the economic and technical problems associated with frequency stability, tolerance, and multipath propagation that are associated with narrowing the channel bandwidth. For example, the channel spacing of 6.25 kHz helps to minimize filtering requirements in the receiver Minimum filtering lowers the cost per unit, and also ensures that the receiver performance is optimal with faded signals. This 6.25 kHz spacing also has the additional advantage of being a sub-multiple of 25 kHz, such that other narrowband technologies, such as narrowband FM at 12.5 kHz and LPC speech at 6.25 kHz, can be accommodated in an orderly manner.

FIG. 2 also shows the location of the control channel within the voice channels. If a control channel containing continuous high speed FM signalling data is used in the five channel group, the control channel should be placed at the center of the group as illustrated. This arrangement minimizes the frequency spread of distortion products produced by linear power amplifier 133. Similarly, the central controller will be directed to make voice channel assignments first to those frequency allocations which are nearest to the control channel.

The present embodiment utilizes 2400 bps NRZ-FSK modulation with discriminator detection for the high speed data format. Although other data formats, such as GMSK were considered, NRZ-FSK is simple to generate and detect and provides good performance results. The high speed FM data signal is generated by frequency modulating a radio frequency (RF) data carrier which is located 1900 Hz above the suppressed pilot frequency reference. Optimum deviation for the FM data was found to be approximately 800 Hz. The pilot carrier itself is suppressed in the control channel; hence, no pilot carrier is transmitted with the FSK data signal. This suppressed-carrier scheme has the advantages of: (1) allowing the modulation peak envelope power (PEP) to be increased; and (2) permitting the receiver discriminator, which is already required to demodulate the data, to also be used to provide AFC. This permits faster acquisition of the base station frequency than if AFC were obtained from a pilot carrier Furthermore, the problems of acquiring lock to a pilot in the presence of high speed data signal are avoided. The IF filter bandwidth is sufficiently wide to permit the discriminator to respond to the data carrier over the entire range of system frequency error. This AFC technique will be discussed in detail in conjunction with FIG. 5.

FIG. 2 further illustrates an exploded diagram of a representative voice channel. The upper SSB voice band is generated by selecting the upper sideband of the amplitude modulated RF carrier via a band pass filter. The upper sideband modulation has a bandwidth of approximately 3500 Hz within the 6.25 kHz channel. The RF carrier itself is attenuated to approximately 16 dB below PEP to provide a reference pilot which is used in voice signal demodulation. An audio subcarrier, located above the voice band at approximately 3460 Hz, is modulated with low speed FM data to provide subaudible signalling. This low speed data is transmitted continuously with the voice. In the present embodiment, the low speed data carries tone squelch information via FSK modulation of the audio subcarrier at approximately 80 hertz deviation. The low speed data is transmitted at approximately 17.5 dB below PEP. Hence, the total PEP is approximately 3.0 dB above the peak voice power.

Figure 3A:
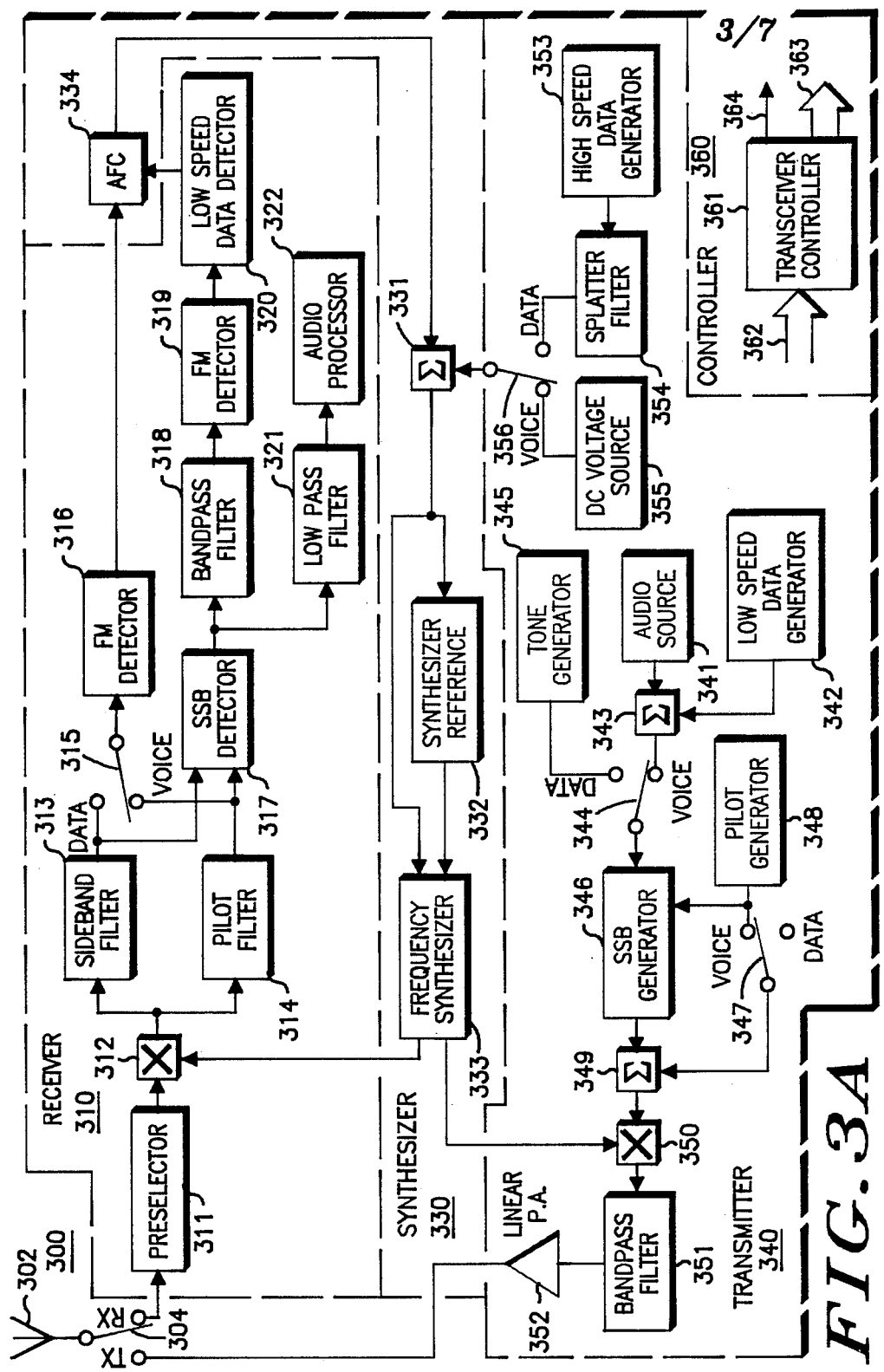
FIG. 3a is a simplified block diagram of a mobile radio transceiver according to the present invention.

FIG. 3a illustrates a block diagram of dual-mode transceiver 300. The transceiver is comprised of receiver block 310, synthesizer AFC block 330, transmitter block 340, and controller block 360. Transceiver 300 represents the preferred embodiment of mobile transceiver 110 of FIG. 1. However, much of the circuitry of the mobile transceiver is common to base transceiver 120, with the exception of the channel multiplexing circuitry and the baseband feedback circuitry.

Transmitter audio source 341 includes a microphone, pre-amplifier, a 300 Hz high pass filter, a +6 dB per octave preemphasis filter, and an overdeviation amplitude clipper. Audio source 341 may also include a 2:1 syllabic compressor if amplitude companded SSB is desired. The output of audio source 341 is applied to summing network 343 to provide transmitter voice modulation. Low speed data generator 342 includes a 3.46 kHz audio subcarrier generator which is modulated with low speed data. In the preferred embodiment, the low speed data is equivalent to CTCSS (continuous tone coded squelch system) information which modulates the audio subcarrier by FSK at approximately 80 Hz peak frequency deviation. The transmitter voice signals and low speed data signals are summed together at summing network 343 and applied to modulation switch 344. Switch 344 is controlled by the data/voice (D/V) output control signal 364 of transceiver controller 361. In the voice mode, the audio modulation and low speed data modulation are applied to SSB generator 346. In the data mode, audio tone generator 345 produces a 1900 Hz tone to generate an exciter output signal, which is subsequently frequency modulated by high speed data generator 353 via synthesizer 340 in order to transmit high speed data. An alternate high speed data modulation approach will be discussed later in FIG. 3b.

Either the voice (and low speed data) modulation or the tone generator signal is applied to SSB generator 346. The SSB drive signal produced by SSB generator 346 is upper sideband (USB), and is generated using the conventional balanced mixer/sideband filter approach which is known in the art. SSB pilot generator 348 produces a 5.2 MHz pilot carrier signal. The pilot generator signal at the output of SSB generator 346 is suppressed by both the balanced mixer and by the selectivity of the sideband filter. In the data mode, pilot switch 347 opens to prevent the pilot carrier from being sent. In the voice mode, the 5.2 MHz pilot carrier from block 348 is combined with the USB drive signal from block 346 in summing network 349. This SSB signal at 5.2 MHz is then up converted to 825 MHz by mixing with a local oscillator (LO) frequency from frequency synthesizer 333 in up-converter 350.

Although not shown in the simplified block diagram of FIG. 3a, the up conversion may be performed in several stages. For example, in the preferred embodiment of base transceiver 120, the SSB voice signal, which also incorporates a low speed data subcarrier and a pilot, is up-converted to a band of frequencies at approximately 28 MHz by a local oscillator signal that is an integer multiple of the frequency of synthesizer reference 332. The resulting signal is subsequently up-converted in up convertor 350 to approximately 825 MHz by a signal from frequency synthesizer 333.

In the mobile, the output from mixer 350 is routed to bandpass filter 351, which is designed to remove undesired mixer products. The filtered output signal is then applied to linear power amplifier 352. Amplifier 352 should be capable of operating at a rated PEP of 15 to 20 watts with 5 spurious adjacent-channel modulation products ("splatter") at least 60 dB below PEP. The amplified signal from power amplifier 352 is then applied to transmit/receive switch 304. In the transmit mode of a simplex radio, the transmitter signal is routed to antenna 302 to be transmitted to the base station.

In the transmitter embodiment shown in FIG. 3a, the high speed data is used to directly frequency modulate both the reference oscillator and the synthesizer VCO such that the RF output signal offset by the 1900 Hz audio tone from tone generator 345 is frequency modulated. High speed data generator 353 provides the 2400 bps NRZ-FSK data modulation input to splatter filter 354. Filter 354 is a linear phase low pass filter having a −3 dB cutoff frequency of approximately 1200 Hz which provides splatter protection by substantially removing any harmonic content present in the data. Thus, the high speed data may be generated as a square wave, and the splatter will be substantially reduced by the low pass filter. The filtered data is then applied to reference switch 356, along with the output of DC voltage source 355. Under control of D/V signal 364, switch 356 applies either the filtered high speed data or the DC reference voltage through summing network 331 to synthesizer reference 332. In the voice or receive data mode, switch 356 applies constant DC voltage to summing network 331 such that synthesizer reference oscillator 332 is not modulated. In this mode, frequency synthesizer 333 provides an unmodulated local oscillator signal to both receiver 310 and transmitter 340. Switch 356 remains in this voice mode until the transceiver controller determines that high speed data should be transmitted.

FIG. 3b (drawing page 6/7) illustrates an alternate implementation for providing high speed data modulation. In this embodiment, high speed data generator 353 is applied to directly frequency modulate audio FSK generator 357 to provide data to modulation switch 344. The approach illustrated in FIG. 3b relies upon the transmitter SSB filter to contain out of band emissions. On the other hand, the approach of FIG. 3a relies upon premodulation splatter filter 354 for this task. Although the latter approach yields a more sensitive system with less intersymbol interference, the splatter protection is 12 to 14 dB worse with the premodulation splatter filter. Note that no pilot carrier is transmitted with the high speed data signal. This allows the modulation PEP to be increased by approximately 3.0 dB. This also has other advantages pertaining to AFC acquisition, which will be described later.

Receiver block 310 of FIG. 3a illustrates a simplified version of the dual-mode receiver according to the present invention. A more detailed block diagram and description will be provided in conjunction with the receiver diagram of FIG. 4. The dual-mode receiver is capable of demodulating single sideband AM analog voice as well as narrowband FM digital data. The transmitted 800 MHz signal is received at antenna 302, and applied to receiver 310 through transmit/receive switch 304. Preselector 311 provides frequency selectivity which reduces the spurious responses in mixer 312. The local oscillator signal from frequency synthesizer 333 is used to down convert the signal to the appropriate intermediate frequency (IF) by means of mixer 312. In the preferred embodiment, the receiver is actually a triple conversion receiver, having IF frequencies of 73.6 MHz, 5.2 MHz, and 12-16 kHz, as will be described later. The IF signal produced at the output of mixer 312 is then applied to both sideband filter 313 and pilot filter 314. Pilot filter 314, which has a bandwidth of 300 Hz, separates the pilot carrier from the single sideband signal. Conversely, sideband filter 313, having a bandwidth of approximately 3300 Hz, separates the upper sideband from the pilot signal. Filter 313 is used for data as well as voice.

Both the upper sideband and pilot signals are applied to SSB detector 317. The pilot carrier is then used as a frequency reference to demodulate the SSB voice. The demodulated audio signal is then applied to low pass filter 321, which has a −3 dB cutoff frequency of 3000 Hz. This filter removes the low speed data subcarrier signal at 3460 Hz from the voice band. The voice band audio is then processed utilizing feedforward AGC, deemphasis, amplitude expansion and squelch control in audio processor 322.

The demodulated USB signal from SSB detector 317 is also applied to bandpass filter 318 which is centered around the audio subcarrier at 3460 Hz to remove any voice signals. FM detector 319 demodulates the low speed data, and low speed data detector 320 provides low speed data information to AFC block 334.

In the voice mode, the pilot carrier signal from pilot filter 314 is routed through switch 315 to FM detector 316. The pilot carrier is then used as an AFC reference for the receiver. In the data ode, the high speed data from sideband filter 313 is fed through switch 315 and demodulated by FM detector 316. The demodulated high speed data is then routed to AFC 334, where it is detected to provide signalling and handshake information to the mobile radio controller. Block 334 also derives an AFC control signal from the high speed data RF carrier. This technique will be explained in detail in accordance with FIG. 5.

Controller block 360 generally illustrates that transceiver controller 361 provides data/voice switching signal 364 and radio transceiver control lines 363 in response to indicator lines 362 from the receiver and AFC. Controller 360 will be described in detail in conjunction with FIGS. 6 and 7.

Figure 4:
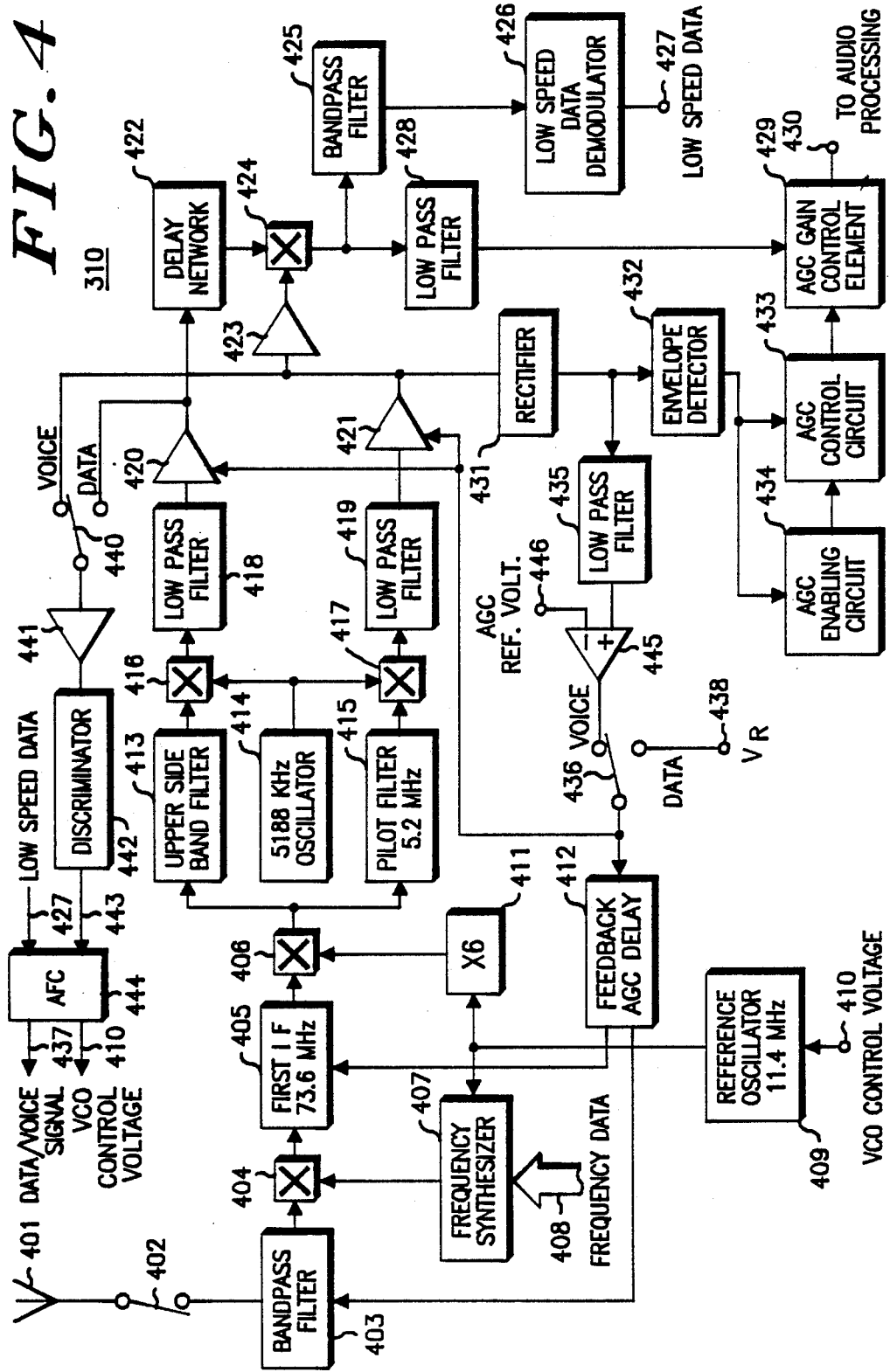
FIG. 4 is a detailed block diagram of a single sideband receiver capable of deriving AFC from either the voice or data channel according to the present invention.

FIG. 4 is a detailed block diagram of dual-mode receiver 310. FIG. 4 also includes portions of synthesizer circuit 330 of FIG. 3a in order to show the operation of the AFC circuitry. AFC circuit 444 of FIG. 4 is illustrated in detail in FIG. 5, which also shows the interface to the mobile radio controller.

The receive signal from antenna 401 is applied through antenna switch 402 to bandpass filter 403. Filter 403 substantially rejects the spurious responses which are inherent in the operation of first mixer 404. Bandpass filter 403 also performs an attenuator function (described later) controlled by AGC delay block 412 such that the filter functions as an AGC attenuator.

The 800 MHz signal from filter 403 is then applied to first mixer 404 along with the local oscillator output of frequency synthesizer 407. Frequency data information 408 from the mobile radio controller is input to frequency synthesizer 407 to determine the proper local oscillator frequency for each channel. The synthesizer provides low-side injection to the first mixer. For example, if control channel $F_C$=870 MHz were being received in the mobile, the local oscillator frequency would be 870−73.6 MHz=796.4 MHz. The principal elements of the synthesizer are a VCO, a divide-by 127/128-800 MHz prescaler, and a phase lock loop (PLL) frequency synthesizer with external charge pump. An 11.4 MHz reference oscillator 409 is employed as the reference frequency. Reference oscillator 409 is controlled by VCO control voltage 410. This control voltage is derived from the AFC in the receive mode which keeps the mobile receiver frequency locked to the ultrahigh stability base station signal.

The output of first mixer 404 is filtered and amplified by first IF filter 405 at 73.6 MHz, and coupled to second mixer 406. Synthesizer multiplier 411 multiplies the 11.4 MHz reference oscillator frequency by 6 in order to provide a second injection signal to second mixer 406 at 68.4 MHz. The output of second mixer 406 at 5.2 MHz, is coupled to both upper sideband (USB) filter 413 and pilot filter 415. As previously discussed, the narrow-band pilot filter separates the pilot carrier signal from the upper sideband signal. Pilot filter 415 is of a two-pole Butterworth design having a total 3 dB bandwidth of ±300 Hz centered at 5.2 MHz. USB filter 413 has a bandwidth dictated largely by the high speed data signalling requirements. Since the filter bandwidth is greater than that required for communications-quality voice transmission, the extra bandwidth above the voice band may be used to communicate low speed data on an in-band audio subcarrier. In the preferred embodiment, upper sideband filter 413 is a crystal upper sideband voice filter which is commonly used in point-to-point frequency division multiplex equipment.

The third local oscillator injection is provided by 5188 kHz oscillator 414. This LO signal is coupled to both upper sideband mixer 416 and pilot mixer 417. The resulting output signal mixing products, which are selected by lowpass filters 418 and 419, are the 12-16 kHz USB and 12 kHz pilot signals, respectively. These signals are applied to gain controlled amplifiers 420 and 421. The gain controls for these two AGC amplifiers are fed from a common point. It is necessary to ensure that the gain of these amplifiers varies in a similar way as the control voltage changes so as to avoid dynamic range problems. Sufficiently close gain control tracking can be obtained using the two amplifier sections of a RCA CA3280 operational transconductance amplifier.

Proper SSB demodulation of voice requires that a reference carrier be generated within 20 Hz of the true carrier frequency. If SSB is to be employed in a commercial radio transmission system in other than the HF (3-30 MHz) band, a demodulation reference must be sent with the voice band signal so that any frequency error can be automatically corrected. As previously noted, this demodulation reference is the single-frequency pilot signal derived from pilot filter 415. A pilot carrier system readily permits the use of a minimally complex demodulator that does not restrict the voice band in any way. Furthermore, this type of SSB system does not necessarily require the use of phase-locked loops, which may degrade the performance of the receiver if subject to fast multipath fading.

The pilot carrier signal from amplifier 421 is coupled to rectifier 431, discriminator switch 440, and limiter 423. The rectifier is part of the AGC control circuitry which will be described later. Switch 440 is part of the dual-mode discriminator circuitry, and will also be described later. Limiter 423 amplitude limits the filtered pilot carrier signal, and uses the signal as a frequency reference with which to mix the USB signal down to baseband audio in mixer 424. Due to the differing bandwidths of upper sideband filter 413 and pilot filter 415, there is a time delay apparent on the pilot signal envelope. To compensate for this delay, linear delay network 422 is inserted in the USB signal path. In the preferred embodiment, delay equalization is accomplished in delay network 422 by means of a Reticon R5106 charge-coupled delay line which operates at the 12-16 kHz third IF frequency. When the envelope delays are matched by adjustment of the delay line clock frequency, the random FM produced by multipath signal propagation is substantially cancelled in the demodulator, leaving a pure audio tone without significant frequency modulation at the output. Although the fade-induced frequency disturbances are corrected by this means, amplitude variations due to insufficient bandwidth in the feedback AGC still remain.

The feedback AGC response cannot possibly be made fast enough to eliminate the amplitude fluctuations due to 800 MHz Rayleigh fading. Feedback AGC will only maintain a constant amplitude output for deep fades when the Doppler shift is less than approximately one-tenth of the −3 dB bandwidth. The −3 dB bandwidth of the preferred embodiment receivers is approximately 80 Hz; consequently, the feedback AGC is really only effective up to a maximum Doppler frequency of about 8-10 Hz. However, 55 mph, the maximum Doppler shift experienced by an 840 MHz carrier is 70 Hz. Consequently, a second AGC system employing feedforward control is necessary to remove the substantial amplitude fluctuations that remain at the IF output.

The feedforward AGC consists of four elements: envelope detector 432; AGC enabling circuit 434; AGC control circuit 433; and AGC gain control element 429. Envelope detector 432 employs the full-wave rectified signal from rectifier 431 so as to produce a ripple-free control signal from the 12 kHz pilot signal with minimum delay. This envelope-detected signal is applied to AGC enabling circuit 434, which disables the feedforward AGC at weak signal levels to prevent excessive noise output from the receiver. When feedforward AGC is used in a receiver with feedback AGC having enough reserve gain to maintain both signal and noise constant, the receiver may exhibit noise bursts much like that of an FM receiver when the signal level drops. The solution to this problem is to limit the maximum increase in gain to 10 to 15 dB via AGC control circuit 433. This limited AGC signal from block 433 is applied to gain control element 429, which provides automatic gain correction for the SSB audio signal which is subject to amplitude variation due to fading. The SSB audio signal is then output at 430 to appropriate audio processing circuitry, which may include amplitude expansion if compression was used on transmit. Audio processing circuitry may also include a deemphasis network to remove audio distortion, assuming that preemphasis was performed in the transmitter, thereby achieving a balanced system.

The rectified pilot signal from rectifier 431 is also applied to low pass filter 435, which defines the bandwidth of the AGC. The output of the lowpass filter 435 is coupled to amplitude comparator 445, which compares the average value of the rectified pilot signal with reference voltage 446 and produces an AGC control voltage The output of amplitude comparator 445 is coupled to AGC switch 436, which is controlled by data/voice signal 437 from AFC block 444. Switch 436 operates to control the AGC for the dual-mode receiver. In the voice mode, the feedback AGC operates in a normal closed-loop manner to make the average value of the rectified pilot signal equal to the AGC reference voltage 446. However, in the data mode, the AGC feedback loop is opened and the AGC control voltage is connected to a fixed voltage $V_R$ at 438, which forces the receiver gain to be at or near its maximum value. Hence, in the data mode, dual-mode SSB receiver 310 operates much like a limiting FM receiver, while operating with AM-AGC in the voice mode.

Feedback AGC delay circuit 412 contains control circuitry which applies the AGC control voltage to the first IF 405 and to bandpass filter 403 only when the gain control range of amplifiers 420 and 421 is exceeded. This ensures that operation of the feedback AGC will not degrade the noise figure of the receiver.

The baseband audio signal obtained from the output of mixer 424 is coupled to low pass filter 428, which has a −3 dB cutoff frequency of 3000 Hz. This filter removes the low speed data subcarrier signal from teh voice band signal. The voice band signal is then coupled to AGC gain control element 429.

The baseband audio signal obtained from the output of mixer 424 is also applied to bandpass filter 425, centered at 3460 Hz, which separates the low speed data subcarrier from the voice. The filtered low speed data is then coupled to low speed FM data demodulator 426, which outputs low speed data 427 to control squelch operation.

Both the upper sideband signal from amplifier 420 and the pilot signal from amplifier 421 are applied to discriminator switch 440 to allow the receiver to derive AFC in either the voice or data mode. In the data mode, discriminator switch 440 allows FM data from the USB filter to be coupled to limiter 441 and discriminator 442. In the voice mode, the pilot signal from pilot filter 415 is routed through switch 440 and limiter 441 to discriminator 442. Limiter 441 functions to remove amplitude fluctuations from the discriminator which may be due to noise or varying signal amplitude. Discriminator 442 demodulates the FM high speed data in the data mode, and also serves as an indicator of received signal frequency in either the voice or data mode. The discriminator output at 443 is coupled to AFC 444, along with low speed data 427 from low speed data demodulator 426. AFC circuitry 444 outputs data/voice control signal 437, and VCO control voltage 410. VCO control voltage 410 corrects the frequency of reference oscillator 409. When the transceiver is in the transmit mode, VCO control voltage 410 is digitally stored by AFC circuit 444 such that the frequency stability of the base station is substantially imparted to the mobile unit transmitter.

It can now be appreciated that dual-mode receiver 310 can receive both single sideband amplitude modulated voice signals and narrowband frequency modulated data signals, the receiver acting as an SSB-AM receiver with AGC in the first mode and as a limiting-FM receiver in the second. AFC is derived from the available received signal in either mode.

Generally, the dual-mode AFC is designed to demodulate and derive AFC from either a received single sideband pilot carrier signal or a received narrowband frequency modulated data signal. The AFC is initially acquired on the data signalling channel by utilizing the high speed FM data carrier as an AFC reference. When the receiver subsequently switches to a voice channel, fine corrections to the receiver frequency are made by using the SSB pilot carrier as a reference. During the mobile transmit mode, the VCO control voltage is memorized. This dual-mode AFC technique allows high speed data to be sent in the same narrowband channel as voice, while retaining frequency lock to the high stability base station master reference frequency in both modes of modulation.

The AFC incorporated into the mobile transceiver is a key element in the implementation of the 800 MHz trunked SSB system of the present invention. The AFC characteristics strongly affect the operation of other system functions, such as the mobile radio controller timing sequences, the operation of the SSB demodulator, and the feedforward AGC. The basic principles and assumptions of the instant AFC design are as follows:

1. The allowable frequency error of the base receiver and transmitter is less than or equal to 0.15 ppm. This represents an absolute error of about ±120 Hz at 816 MHz; thus, co-channel carrier beats will be inaudible due to the presence of 300 Hz audio high pass filters in the receiver.

2. The mobile transceiver unit will have an allowable frequency error of less than or equal to 2 ppm. Standard FM transceiver components presently include reference elements specified to be within 2 ppm from −40° C. to +70° C. ambient temperature. This corresponds to an absolute error of about ±1630 Hz at 816 MHz.

3. The mobile transceiver, upon turn on, will acquire AFC on the data signalling channel and correct the frequency of the transceiver reference oscillator such that the frequency error of the mobile is within ±50 Hz of the base station 4. The mobile reference oscillator frequency determined through AFC on the data channel is further adjusted on the SSB voice channel by acquiring AFC on the pilot carrier.

5. The mobile reference oscillator frequency determined when receiving base transmissions will be memorized and held during the time when the mobile transceiver is transmitting.

6. It is assumed that the frequency drift of the mobile reference oscillator is small enough during the time the mobile is transmitting to be corrected by a limited-range AFC in the base station receiver.

The AFC system of the present invention incorporates a frequency sweeping circuit. The sweep circuit is only used for initial acquisition of the data channel on power up, after which a continuous AFC control loop determines the frequency of the receiver. When the receiver is changing frequency, transmitting, or when a received signal is absent, the last known frequency control voltage of the reference oscillator is memorized and held constant. Therefore, the AFC requires a "signal presence indication" (SPI) for proper operation. In the high speed data mode, this SPI could be the detection of a particular pattern in the high speed data, or of the presence of the data transmissions themselves. The present embodiment utilizes the latter method. In the voice mode, SPI could be either an AGC voltage, or the detection of correct low speed data on the voice channel. In the present embodiment, SPI is derived from the low speed data detector in the voice mode.

Figure 5:
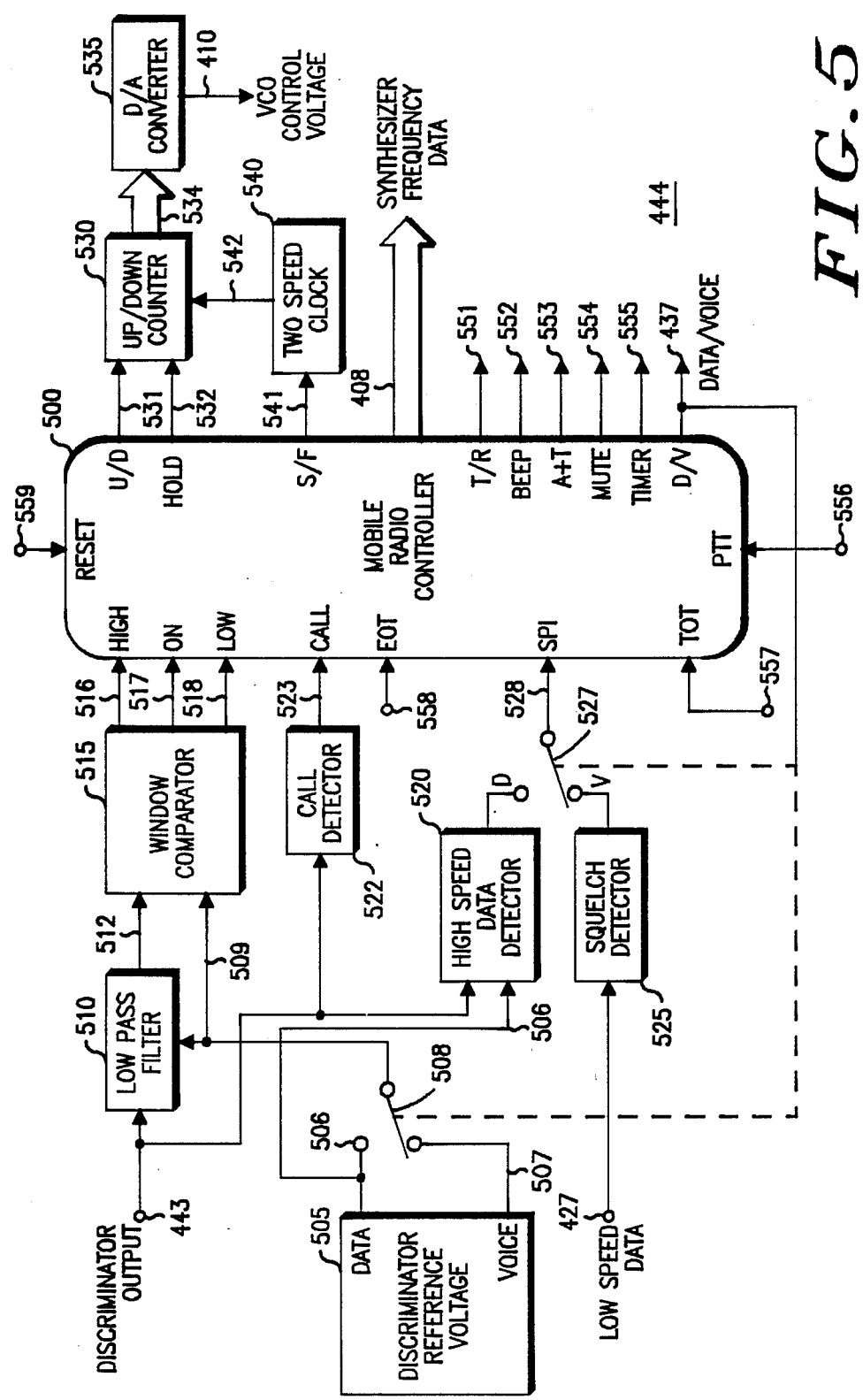
FIG. 5 is a detailed block diagram of the AFC circuitry and the mobile radio controller of FIGS. 3a and 4.

Referring now to FIG. 5, the components of AFC circuitry 444 and their functions will now be described. Discriminator output 443 is applied to low pass filter 510, which has a 3 dB cutoff frequency of approximately 0.27 Hz. Low pass filter 510 passes the average voltage of discriminator output 443, which corresponds to the average frequency of the discriminator input. The cutoff frequency must be low enough to limit voltage variations due to high speed data modulation, but not so low that channel element drift cannot be tracked. The average frequency signal 512 from low pass filter 510 is coupled to window comparator 515. The window comparator uses an appropriate discriminator reference from switch 508 to determine if the discriminator signal is within an acceptable range.

Two precise voltage references, data reference 506 and voice reference 507, are supplied by discriminator reference 505. In the voice mode, discriminator reference switch 508, controlled by data/voice signal 437, couples voice discriminator reference 507 to window comparator input 509. Input 509 then corresponds to the average voltage of the discriminator output when the discriminator input is derived from an SSB pilot carrier which is properly centered in the pilot carrier filter. In the data mode, switch 508 couples data discriminator reference 506 to window comparator input 509. The voltage reference then corresponds to the average voltage of the discriminator output when the discriminator input is derived from a data carrier properly centered in the upper sideband filter.

Window comparator 515 produces three output signals to indicate the direction of the AFC correction needed. A high signal 516 indicates that an upward frequency correction in the VCO is needed. A low signal 518 indicates that a downward frequency correction in the VCO is needed. ON signal 517 indicates that the receiver is on frequency. Mobile radio controller 500 utilizes these frequency correction indicators for the AFC whenever signal presence is indicated.

In the high speed data mode, signal presence indicator (SPI) 528 is provided by high speed data detector 520. The function of high speed data detector 520 is to determine whether or not high speed data is present in the discriminator output, thus indicating presence or absence of signal in the data mode. Detector 520 utilizes the discriminator output 443 and the data discriminator reference 506 to determine this by detecting the presence of transitions in the discriminator output which occur at the high speed data clock frequency. Another embodiment of high speed data detector 520 would detect the presence of a particular repeating pattern in the high speed data. Squelch detector 525 utilizes low speed data 427 which is sent with the voice to determine whether or not a signal is present in the voice mode by detecting the presence of a particular pattern of coded data. In either mode, an SPI indication is coupled by SPI switch 527 as controlled by data/voice signal 437. Call detector 522 provides a call indication signal 523 to the mobile radio controller whenever a transceiver unit is being paged by the central controller at the base station. The call detector operates by detecting the occurrence of a particular pattern of coded data.

Upon power up, the synthesizer is programmed to go to the high speed data signalling channel. The AFC initially forces the frequency reference in the transceiver to sweep ±2 kHz at a fast rate of 2 kHz/second. At some point in the sweep cycle, the frequency error of the transceiver reference (minus the minor error in the base) will be compensated. The receiver will then recognize that 2400 bps data is being received. The AFC sweep rate is then slowed to 100 Hz/second for final centering on a ±50 Hz window. If the frequency is within these limits, the AFC is considered to be "on frequency." The information derived from the high speed data is coupled to mobile radio controller 500 to control the operation of the transceiver. The transceiver is then instructed to move to a voice channel to either place or receive a call. Once on the voice channel, the received pilot carrier is used as the AFC signal to which the transceiver reference can be adjusted. The presence of valid low speed data on the voice channel indicates to the controller that a valid pilot is being used by the AFC circuitry. In the absence of low speed data, the transceiver frequency reference is held.

The fast AFC sweep that occurs at power up can be described as the open-loop mode of the AFC. The sweep is uni-directional, and is terminated by the SPI from the high speed data detector. The SPI circuitry operates in the full USB filter bandwidth, but the frequency window over which the high speed data can be recognized, which is a function of the amount of distortion caused in the USB filter, is approximately ±220 Hz. The response time of the SPI is determined by its own bandpass filter, and is 220 milliseconds under worse case conditions.

The AFC operation changes from open loop to closed-loop operation as soon as the SPI goes high. The sweep rate is also reduced to aid in frequency acquisition. The incoming data signal is frequency demodulated and heavily filtered in lowpass filer 510 in order to determine a voltage corresponding to the average frequency. A comparison of this voltage to the fixed voltage provides a signal which directs the frequency reference accordingly. When in the closed-loop mode, the AFC must reduce the 220 Hz possible overshoot error incurred in the open-loop mode to less than ±50 Hz. This should be done as quickly as possible. However, the faster the slow sweep rate is, the higher the cutoff frequency of lowpass filter 510 must be in order to avoid an underdamped loop. If lowpass filter 510 is too wide, the random bit pattern will cause the "on frequency" voltage to vary excessively. A filter cutoff frequency of 0.27 Hz is used in the present embodiment, and the AFC slow sweep speed employed for use with this filter is 100 Hz/second. This narrow filter bandwidth is necessary in order to reduce the variations in average frequency due to the random FM present when the received signal is fading.

AFC operation on a voice channel is essentially the same as for the closed-loop system described above. The same loop filter and slow sweep speed that were used on the data channel are used on the voice channel. However, now the "on frequency" reference voltage is lower, since the pilot carrier frequency is 1900 Hz below the center frequency of the high speed data. The voltage reference is switched accordingly. The audio subcarrier with low speed data is demodulated and the data is detected to determine whether the AFC should be allowed to adjust the transceiver frequency reference. The frequency reference is held constant in the absence of a proper low speed data code, and the system controller waits for either a valid code or a time-out indication to return to the data channel. The fast sweep mode is never used on the voice channel.

The discriminator used is a delay-line discriminator in the 12 kHz IF, which is implemented using a Motorola MC14562B shift register. The discriminator constant is 1 mv/Hz. The clock for the discriminator is derived from a crystal oscillator, so the signal delay is extremely stable and should not contribute significantly to frequency errors.

Discriminator reference 505 is based on the Motorola TL431 programmable voltage reference IC. The nominal voltages of the references are 3.75 volts DC for voice reference 507, and 5.65 volts DC for the data reference 506. Low pass filter 510 is comprised of a single pole RC circuit having a 0.27 Hz cutoff frequency. This very low cut off frequency requires large component values. In the preferred embodiment, the resistor is 150 kilohms, and the capacitor is 3.9 uF. To facilitate switching between voice and data channels, one end of the capacitor is tied to the switched discriminator reference 509.

The ±50 Hz frequency window defined by window comparator 515 is produced by two sections of an LM339 quad comparator which are biased to switch when the discriminator voltage deviates by more than 50 mV from the switched discriminator reference 509. A NOR gate is employed to create the ON (frequency) signal 517 from the output signals of the two comparators.

High speed data detector 520 is composed of a limiting amplifier, two edge detectors, a commutating bandpass filter, a rectifier, and a threshold detector with a fast rise time and slow fall time. Pulses generated at the rising and falling edges of the demodulated high speed data input from discriminator output 443 provide significant energy at 2400 Hz, which is extracted by a bandpass filter having a bandwidth of 30 Hz. The rise time constant of the threshold detector is 11 ms, and the fall time constant is 1.5 seconds. This arrangement provides a great deal of fade protection for the signal presence indicator (SPI) output. Call detector 522 is in parallel with high speed data detector 520, and is of a similar design. An alternate embodiment of a call detector would be a correlation detector. Call detector 522 may also be incorporated as part of mobile radio controller 500.

The operation of mobile radio controller 500 is described in detail in the following figures. In general, mobile radio controller 500 remembers the present state of the mobile, accepts information from the radio transceiver circuitry, determines the proper next state based on these input signals and the present state, and then produces corresponding output control signals. The input/output lines 551–559 are particular to the radio transceiver used in the preferred embodiment, and are illustrated in FIG. 5 to better describe the function of the state table diagrams of FIG. 7.

Up/down counter 530 utilizes up/down control signal 531 and HOLD control signal 532 from mobile radio controller 500 to produce digital output signals 534. Digital-to-analog converter 535 changes digital output signals to the required analog VCO control voltage 410. Two speed clock 540 controls the slope of the VCO control voltage-versus-time characteristic. For initial AFC acquisition, a fast sweep speed of approximately ±2 kHz/second is used. When the presence of high speed data is detected by high speed data detector 520, slow/fast clock line 541 instructs two speed clock 540 via clock line 542 to slow a second speed of 100 Hz/second which allows frequency centering in the desired window. As previously described, the significant reduction in sweep speed is necessary because the discriminator output is processed by low pass filter 510 which has a very low cutoff frequency. The slow speed is also used in the voice mode, since the VCO control line voltage is known to be within the ±50 Hz window when the voice mode is entered. During the transmit mode, HOLD control line 532 halts the operation of up/down counter 530, such that the VCO control voltage 410 is memorized. This hold operation also takes place during the switching time between the data and voice modes.

In the preferred embodiment, up/down counter 530 is an 8-bit up/down counter formed from two Motorola MC14515B 4-bit counters. The counter is unidirectional when in the fast-sweep or open-loop mode, and bidirectional in the slow-sweep or closed-loop mode. Two-speed clock 540 is implemented using a Motorola MC1555 timer and a switched timing capacitor. D/A converter 535 is a Motorola MC1408 digital-to-analog converter.

Mobile radio controller 500 outputs frequency data 408 to frequency synthesizer 407 (FIG. 4) to determine the correct receive/transmit channels. PTT input line 556 indicates a push-to-talk transmit request to the controller. T/R output line 551 and A+T output Line 553 provide transmit/receive switching controls to the radio circuitry. EOT (end-of-transmission) input line 558 is used in conjunction with transmitting low speed data. Mute output line 554 is used to control the radio squelch circuitry. Timer output line 555, and time-out-timer (TOT) input line 557, are used with an external timer circuit. Reset line 559 is used with external power-up-reset circuitry. Beep output line 552 controls an indication to the user that the system is busy. These inputs and outputs of mobile radio controller 500, among others, will be described in detail in conjunction with the following figures.

FIG. 6 is a flowchart representing the sequence of operations performed by mobile radio controller 500. Mobile controller 500 is a state machine designed to output the proper control signals based upon present receiver input signals and past history. The mobile controller of the preferred embodiment has seven input signals, twelve states, and eight output signals. Each of these states and output signals will be described in detail in conjunction with the state table diagrams of FIG. 7.

As illustrated in FIG. 6, the mobile radio controller begins operation at start block 601, and proceeds to block 602 wherein power-up-reset of the mobile transceiver is caused by external reset control signal 559. As indicated in block 603, the present state of the controller is initially set equal to state zero, which is the power-up or reset state. In state zero, as indicated by block 604, the frequency synthesizer is programmed to receive the data channel. In block 605, external control signals are accepted by simultaneously clocking all seven input signals into the controller. These input signals, such as reset, signal presence indicator, AFC on frequency, time out timer, etc., are then utilized to determine the next controller state and corresponding output control signals as a function of the controller's present state and these input signals. This step is performed in block 606 by utilizing the state tables programmed into the controller's memory. The state tables for the preferred embodiment are contained in the Appendix. An alternate approach would be to calculate the next state and output signals through the use of a computer algorithm. However, this approach was not as efficient in the preferred embodiment as the instant approach of a ROM look-up table.

After the next state and output signals are determined, the output control signals are sent to the radio transceiver in block 607. Depending on which state has been chosen as the next state, the frequency synthesizer may or may not have to be re-programmed to receive or transmit a different channel. This decision is made in block 608. If, for example, the previous state was the power-up state where the radio is receiving the data channel, and the next state is the transmit state, the frequency synthesizer would have to be programmed to the assigned voice channel in block 609. On the other hand, if high speed data has been detected but a different mobile has been called, then the mobile remains on the data channel in the receive mode. In the latter case, the synthesizer reprogramming sequence of block 609 is bypassed and operation continues with block 610. The mobile radio controller updates the present state to the next state in block 610. The controller remains in the present state until new input signals are clocked into the controller in block 605. Hence, the controller of the present invention functions as a state machine utilizing the present state and input signals to determine the controller's next state.

In the present embodiment, the seven controller inputs and twelve controller states are organized as the eleven address bits each of two 8-bit×2K EPROMS; the seven least significant bits directly represent the inputs to the controller, the remaining four most significant bits represent a binary code for one of the twelve present states of the controller. D flip-flops on all EPROM inputs, with the exception of the RESET line, prevent feedback paths through the transceiver from changing inputs within a controller cycle. The controller clock rate of 44 Hz is limited primarily by the switching time for the synthesizer. Four more states could readily be implemented if desired. Four bits of each of the 8-bit words stored in one of the EPROMS are used as the next state output. The next state becomes the present state after one controller clock cycle.

Again, in the present embodiment, it is necessary to provide eight individual output lines to control the functions of the transceiver. Accordingly, the second 2K EPROM is employed to provide the proper combination of the eight output control signals The eleven address bits of the second 8-bit×2K EPROM are organized in the same manner as the next state EPROM. The 8 bits of each word stored in the second EPROM are then used as outputs to directly control each of the transceiver functions.

The partial state table diagrams of FIG. 7 illustrate how controller 500 performs the state table look-up function of block 606. The actual next state table and output code table of the present embodiment are included in Appendix A and Appendix B, respectively.

Figure 7A:
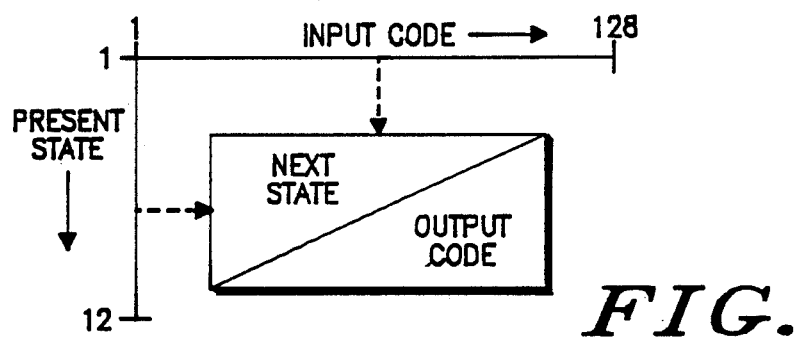
FIG. 7a, 7b, and 7c represent state table diagrams illustrating how the controller of FIG. 5 determines the next state and output signals as a function of the present state and input signals in accordance with the present invention.

FIG. 7a illustrates the basic method of reading the state table diagrams. The 12 present states are arranged on the left side of the state table in ascending order from the top of the vertical axis to the bottom. The input signal code combinations are arranged in ascending order from left to right across the top of the horizontal axis. Since the controller uses seven input lines to determine the next state, 128 possibilities exist ($2^7$) for the input code. The controller utilizes the present state axis and the input code axis as addresses to determine the appropriate next state and output code.

Figure 7B:
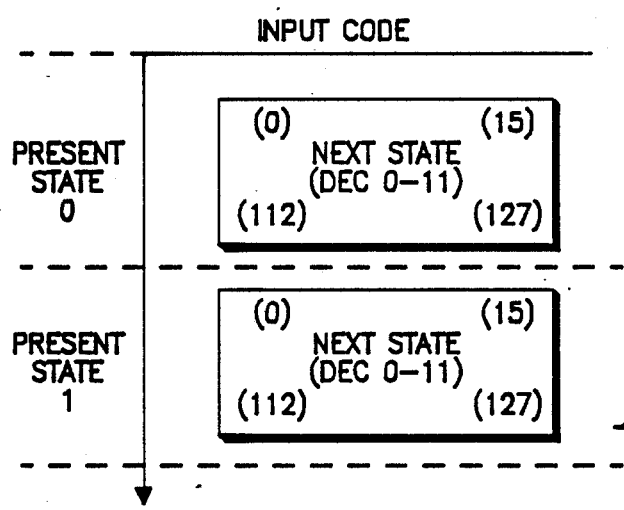

To facilitate faster input code addressing and more efficient use of EPROM memory, the state tables of the preferred embodiment are arranged in a slightly different manner then shown in FIG. 7a. Two state tables, one represents the next state EPROM, and another for the output code EPROM, are utilized. FIG. 7b illustrates the arrangement of the next state table, which will be found as Appendix A. Each present state has been divided into seven rows and fifteen columns of input signals. The first row corresponds to binary input codes of 0–15, the second row corresponds to binary input codes 16 through 31, etc. The seventh row corresponds to binary input codes 112 through 127. Hence, the 128 input code possibilities for present state zero have been arranged to more quickly address the next state. The same input code addressing arrangement is duplicated for present state one. As may be seen from Appendix A, the next state information is available from the first EPROM in decimal numbers (0–11).

Figure 7C:
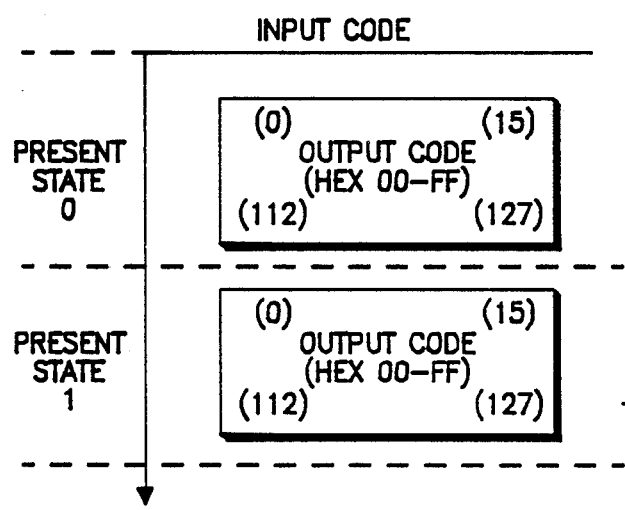

FIG. 7c illustrates the addressing scheme for the output code EPROM state table found as Appendix B. The addressing scheme is exactly the same for the output code table as that of the next state table previously described in FIG. 7b. However, the output code information is given in hexadecimal notation (00–FF). Hence, there are 256 output code possibilities for the eight output signal lines.

An example of utilizing the state tables of the appendix is given below. Assume that the mobile radio has just been turned on, such that the present state is STATE 0. Furthermore, assume that the reference oscillator 409 has been swept to a frequency such that the received signal falls within the response range of the signal presence indicator (SPI) 528, but does not fall within the response range of the ON indicator 517. Also, assume that the mobile user has pressed the microphone PTT switch. With these assumptions, PTT 556 and SPI 528 are high, and the rest of the input signals are low. This input combination would represent a binary 0000110 which is equivalent to decimal 6. To determine the next state, the controller utilizes this binary input code and present state information to address the next state table of Appendix A. The next state may be found to be STATE 4, by reading 4 from the first row and seventh column of present STATE 0. This address location corresponds to binary input code 6. Similarly, the output code may be determined by reading the first row, seventh column of present STATE 0 in Appendix B to find hexadecimal 04. This output code tells the controller to change output line slow/fast (S/F) 541 to the "slow" clock condition and to deactivate all other output lines. The controller outputs this information and changes the present state to STATE 4.

An alternative method for arriving at the proper level in the tables of Appendix A and Appendix B is to convert the input binary code to hexadecimal code, and then use the first hexadecimal digit to calculate the row number within the entries for the proper present state, and use the second hexadecimal digit to calculate the column number. For example, input hexadecimal code MN corresponds to the entry in the (M+1)th row and the (N+1)th column of the entries for any particular present state.

Continuing with the example above, assume that the controller is in STATE 4. Also assume that the mobile user is still pressing the microphone PTT switch. Furthermore, assume that the frequency of reference oscillator 409 has been corrected such that the signal falls within the response range of the ON indicator 517. However, also assume that the mobile user has driven out of range of the base transceiver signal such that the SPI indication 528 is low. Under these conditions, the input word is binary 0000101 which is equivalent to hexadecimal 05. The next state is found in the first row and sixth column of present STATE 4 in Appendix A—next STATE 2. Similarly, the output code from Appendix B is found to be hexidecimal 4C. Thus, beep output line 552, timer output line 555, and slow/fast (S/F) output line 541 are activated, and all other outputs are deactivated. The controller then advances to STATE 2.

The activation of timer output line 555 causes, the activation of time out timer (TOT) input line 557 due to circuitry external to the controller. Assuming that no other input lines change as the controller advances to STATE 2, the input code will then be binary 0010101 which is equivalent to hexadecimal 15. The second row and sixth column of present STATE 2 in Appendix A indicates that the controller is to remain in STATE 2. Similarly, the hexadecimal output code 44 may be obtained from Appendix B.

The seven input signals corresponding to the binary input code are listed below, in order, from most significant bit (msb) to least significant bit (lsb).

1. RESET—Input line 559, from either a mechanical switch or external circuitry, tells the controller to return to the power up state.

2. EOT (End-Of-Transmission)—Input line 558 from the low speed data circuitry tells the controller that the low speed data end-of-transmission code has been completed.

3. TOT (Time-Out-Timer)—Input line 557 from external time-out-timer circuitry is used to mask a momentary loss of the signal presence indicator.

4. CALL—Input line 523 from call detector 522 operating on the high speed data, indicates that the present mobile is being called.

5. PTT (Push-To-Talk)—The transmit request line 556 derived from the microphone PTT button.

6. SPI (Signal Presence Indicator)—Line 528 from squelch detector 525 or high speed data detector 520, indicates that 2400 bps data is present on the data channel or that the proper low speed code has been detected on the voice channel.

7. ON (On Frequency)—Indicator line 517 from window comparator 515, tells the controller that the receiver is within a ±50 Hz window of the proper frequency on either the data channel or the voice channel.

The eight controller output signals are listed below in the same (msb-lsb) order:

1. A+T—Output line 553 controls the transmitter final power amplifier keying.

2. BEEP—Output line 552 provides an indication to the mobile user that his PTT signal is being ignored due to lack of an available transmit channel.

3. MUTE—Output line 554 indicates to the receiver squelch circuitry that it should mute the audio.

4. HOLD—Output line 532 to up/down counter 530 indicates that VCO control voltage 410 should be held constant.

5. TIMER—Output line 555 initializes the time-out-timer circuitry.

6. S/F (Slow/Fast)—Output line 541 to two speed clock 540 controls the AFC circuitry by indicating the correct speed at which to sweep the VCO frequency.

7. T/R (Transmit/Receive)—Output line 551 directs the synthesizer, the antenna relay, and the majority of the transceiver circuitry to change from transmit to receive mode.

8. D/V (Data/Voice)—Output line 437 directs the synthesizer and other switching circuitry to change between the data and the voice channels.

The twelve states of the mobile radio controller (STATE 0–STATE 11) are described below:

STATE 0—the power-up or reset state. As previously mentioned, this puts the transceiver in the receive mode on the data channel. This state is also entered when the mobile drives out of range of the base station. The synthesizer reference frequency is being swept at its fast sweep rate of 2 kHz/second in order to try to acquire AFC on the data channel. PTT will be ignored and cause a beep signal. The controller leaves this state when signal presence is detected.

STATE 1—In this state, the signal presence indicator (SPI) is high. However, the synthesizer reference frequency error is greater than 50 Hz. Therefore, the synthesizer reference frequency is being changed at the slow rate of 100 Hz/second for frequency centering. PTT and CALL will be recognized, but will not be acted upon until ON is high. If SPI should go low, the time-out-timer will be initialized and STATE 2 will be entered.

STATE 2—In this state, SPI is low, but the synthesizer reference frequency is being held constant just in case the drop in signal is only momentary. A time-out indication will return the controller to STATE 0. A high SPI signal will change the state of the controller to STATE 1, 3, 4, 5, 6, or 7 according to the other input signals.

STATE 3—SPI and ON are high, such that the synthesizer reference frequency is being held constant. However, neither PTT nor CALL is high, so the controller keeps the mobile transceiver on the data channel in the receive mode waiting for a call or a transmit request.

STATE 4—Here, both PTT and SPI are high, but the synthesizer reference frequency is still off frequency, i.e., ON is low. The synthesizer reference frequency is being changed at the slow rate.

STATE 5—This is the transmit state. This state is entered when PTT, SPI, and ON are all high and CALL is low. As this state is entered, T/R is set high in order to activate the modulation and transmit circuitry. The data/voice signal is set to "voice" to change the mobile from the FM data mode to the SSB voice mode. Once in this state, A+T is set high which indirectly activates the final power amplifier. PTT and RESET are the only inputs which have an effect on this state. When PTT goes low, the controller advances to STATE 11.

STATE 6—In this state, both CALL and SPI are high, but ON is still low since the synthesizer reference frequency is still off frequency. Hence, the synthesizer reference frequency is being changed at the slow sweep rate waiting for ON to go high.

STATE 7—This state is a transition state from the data to the voice channel. STATE 7 is entered when CALL, SPI and ON are all high. As this state is entered, the time-out-timer is initialized, and the synthesizer reference frequency is held constant. The data/voice signal is changed to the voice mode. If the voice channel SPI does not go high before the time-out period expires, the controller will return to STATE 2; i.e., the mobile will return to the data channel. If the voice channel SPI is recognized, the controller proceeds to STATE 9 or 10. In STATE 7, PTT is ignored, since the mobile was called to the voice channel and a lack of a recognizable signal may indicate the mobile has made some kind of error.

STATE 8—This is a waiting state and is similar to STATE 7. The time-out-timer is initialized when this state is entered, and a time-out condition will cause the controller to return to STATE 2. However, before STATE 8 is entered, either the mobile has received the valid voice channel signal, or it has made a transmission on the voice channel. For this reason, PTT is recognized and the controller is advanced to STATE 5. SPI will advance the controller either to STATE 9 or to STATE 10.

STATE 9—This is one of two states for which the mobile is in the receive mode with the audio squelch open. In this state, the voice channel SPI is high, but ON is low. The synthesizer reference frequency is changed slowly to correct for small frequency errors. The controller leaves this state for STATE 10 when ON goes high, or the controller goes to STATE 8 when SPI goes low.

STATE 10—This is the other of the two states for which the mobile is in the receive mode with the audio squelch open. In this state, both the voice channel SPI and ON signals are high. Thus, the synthesizer reference frequency is held constant. This state is exited in a manner similar to STATE 9.

STATE 11—This is an interim state between STATE 5 and STATE 8. When the mobile user releases PTT, this state is entered from STATE 5, and the A+T signal is dropped. This transition causes the low speed data encoding circuitry to output the turnoff code. When the low speed turnoff code is completed, the EOT signal input goes low. This change in EOT causes the controller to go to STATE 8. The EOT signal itself shuts down the transmitter power amplifier. The controller will change the T/R signal back to the receive mode once STATE 8 is reached. This has the effect of delaying the T/R change from the EOT change, which prevents the antenna relay from opening before the power amplifier has turned off, as well as preventing transmission of erroneous signals as the modulation circuitry is being switched by T/R.

As a final example of the operation of the present invention, a complete call sequence operation will now be described.

1. Central controller 130 has established base transmit channel Y and base receive channel X as control channels. The base station operates in the full duplex, non-repeat mode with respect to the control channels.

2. Central controller 130 sends out a continuous background data word on data channel Y. The background data word is a 2400 bps decodable data pattern that allows the mobiles to maintain synchronization in the trunked system.

3. On power-up, mobile radio controller 500 of mobile transceiver 110 is put in STATE 0. Receiver 112 is activated by T/R output line 551. Synthesizer frequency data 408 changes frequency synthesizer 407 such that receiver 112 accepts the signal of base transmit channel Y. Up/down counter 530 is forced to count in one direction by U/D output line 531. Up/down counter 530 counts at the fast speed in accordance with clock line 542. VCO control voltage 410, derived from digital output signals 534, causes synthesizer reference 409 to sweep frequency in such a manner that the received signal of base transmit channel Y (as translated by mixer 404 and mixer 406) moves in frequency across the passband of upper sideband filter 413. Discriminator 442, operating on a frequency-translated version of this signal, passes the baseband signal to high speed data detector 520. When the receiver injection signal, derived from reference oscillator 409, is near the correct frequency, high speed data detector 520 indicates the presence of the 2400 bps background data word to mobile radio controller 500 via SPI input line 528.

4. The change of SPI input line 528 causes mobile radio controller 500 to change to STATE 1. Simultaneously, U/D output line 531 is changed according to the signals on HIGH input line 516 and LOW input line 518. S/F output line 541 is also changed such that two speed clock 540 operates at its slower speed. VCO control voltage 410 adjusts the frequency of reference oscillator 409 such that the continuous background data word on data channel Y (as translated by mixer 404, mixer 406, mixer 416, and discriminator 442) has an average voltage approximating that of data discriminator reference 506. Once the average voltage is within an acceptable window of reference 506 as determined by window comparator 515, ON input line 517 is activated.

5. The change of ON input line 517 causes mobile radio controller 500 to change to STATE 3. Simultaneously, HOLD output line 532 is activated such that up/down counter 530, digital output signal 534, VCO control voltage 410, and reference oscillator 409, are all held constant.

6. Mobile transceiver 115 also powers-up in STATE 0 and arrives in STATE 3 in a manner similar to steps 3 through 5 above for mobile transceiver 110. Mobile transceivers 110 and 115 both decode the 2400 bps background data word of base transmit channel Y.

7. The user of mobile transceiver 115 initiates a call by pressing the microphone PTT button of that transceiver. Recognizing the change on PTT input line 556, mobile radio controller 500 of transceiver 115 changes to STATE 5. Simultaneously, T/R output line 551 and D/V output line 437 of mobile transceiver 115 change value such that transmitter 116 (except linear power amplifier 352) is activated, and receiver 117 is deactivated. When the proper transmit channel is determined, A+T output line 553 of mobile transceiver 115 is activated. This causes power to be supplied to linear power amplifier 352 of mobile transmitter 116.

In the preferred embodiment of a fully trunked SSB communication system, a "high speed handshake" takes place between the mobile requesting a channel and the base station controller. This handshake sequence is described as substeps a–d below. For simplicity, however, the state table diagrams included in the Appendix do not contain this handshake information. The state table diagrams of the Appendix continue with Step 8 below.

(a) The "high speed handshake" begins when the user of mobile transceiver 115 initiates a service request by pressing the microphone PTT button. Mobile 115 then transmits an inbound high speed data signalling word on base receive control channel X. This inbound signalling word contains mobile, subfleet, fleet, and system identification information along with the type of call.

(b) When base station controller 130 receives this inbound signalling request, it will automatically review the present channel assignments and queueing list. If the system is not full, base transceiver 120 will then transmit an outbound signalling word on base transmit control channel Y. This outbound signalling word contains channel assignment information (in the event that a channel is available) or busy status information (in the event that a channel is unavailable).

(c) Upon receipt of the outbound signalling word via control channel Y, all mobiles in the particular fleet switch to the assigned voice channel, e.g. voice channel A/A'.

(d) The appropriate mobile units, now receiving assigned voice channel A', decode the high speed handshake information. The mobile that initiated the call, mobile 115, then sends a high speed data acknowledgement signal back to base transceiver 120 via mobile transmit voice channel A. This acknowledgement signal verifies to the base station that the mobile is on the correct channel.

8. In STATE 5, transmitter 116 transmits a single sideband pilot carrier and low speed FM data on base receive voice channel A via antenna 114. This signal is received by base receiver 150 via antenna 121 and demodulated by voice channel A SSB receiver 124. Central controller 130 recognizes the low speed data code, changes the high speed data pattern being transmitted on base transmit control channel Y from the background data pattern (or outbound signalling word) to a specific call sequence, and instructs base transmitter 140 to transmit a pilot carrier and low speed data pattern on base transmit channel A'.

9. Mobile receiver 112 receives the high speed data pattern being transmitted on base transmit control channel Y. Call detector 522 of mobile receiver 112 recognizes the call sequence being transmitted and changes CALL input line 523 to indicate a valid detection to controller 500 of transceiver 110. Mobile radio controller 500, which was in STATE 3, is changed to STATE 7. Simultaneously, TIMER output line 555 is changed to initialize the time-out-timer, and D/V output line 437 is changed such that mobile transceiver 110 operates in the voice mode. Synthesizer frequency data 408 of mobile transceiver 110 is also changed such that mobile receiver 112 receives base transmit voice channel A'.

10. In the voice mode, low speed data 427 from low speed data demodulator 426 of mobile transceiver 110 is recognized as the proper code by squelch detector 525. SPI input line 528, which was low during the transition to the voice channel, is set high to indicate the presence of the voice signal on base transmit channel A'. This SPI change causes controller 500 of transceiver 110 to change to STATE 10. Simultaneously, MUTE output line 554 is changed to allow the audio signal of receiver 112 to be heard by its user.

11. The user of transceiver 115 now talks into the microphone of that radio. This voice signal is transmitted via single sideband modulation on base receive voice channel A from mobile transmitter 116, and is received and demodulated by voice channel A SSB receiver 124 of base receiver 150. Central controller 130 then patches this voice signal through to modulate voice channel A SSB generator 139 of base transmitter 140. The SSB voice signal is then transmitted on base transmit voice channel A' and received and demodulated by receiver 112. This completes the repeater link between mobile transceiver 115 and mobile transceiver 110.

12. When the user of mobile transceiver 115 has finished his voice communication, he releases the PTT switch for that unit. The change on PTT input line 556 of transceiver 115 causes its controller 500 to advance to STATE 11. Simultaneously, A+T output line 553 is set low. This causes low speed data generator 342 of mobile transmitter 116 to output a "turn-off" code while holding EOT input line 558 high. This turn-off code is recognized by central controller 130, which then directs base transmitter 140 to re-transmit the turn-off code on base transmit channel A'. Subsequently, the SSB signal generated by voice channel A SSB generator 139 is stopped. The high speed data signal being transmitted by base transmitter 140 on base transmit control channel Y is then changed from the specific call sequence to the background data word.

13. Once the turn-off code of mobile transceiver 115 has been completed, EOT input line 558 of mobile transceiver 115 is set low. This causes controller 500 of mobile transceiver 115 to advance to STATE 8, and also removes supply power from linear power amplifier 352. Simultaneously, TIMER output line 555 is set high to initialize the time-out-timer. This causes TOT input line 557 to go high. Once in STATE 8, T/R output line 551 is changed to force transmit/receive switch 304 back to the receive position, to activate mobile receiver 117, and to de-activate mobile transmitter 116. Also, synthesizer frequency data 408 of transceiver 115 is changed such that mobile receiver 117 again receives base transmit voice channel A'.

14. When the turn-off code is received by mobile receiver 112 and recognized by squelch detector 525 of that unit, SPI input line 528 will be set low. Controller 500 of mobile transceiver 110, which previously was in STATE 10, advances to STATE 8. Simultaneously, MUTE output line 554 is set low such that the audio signal of that unit is squelched, and TIMER output line 555 is set high to initiate the time-out-timer of mobile transceiver 110. Accordingly, TOT input line 557 goes high.

15. At this point, both mobile transceivers 110 and 115 are in STATE 8. Either one may initiate a call to the other. However, if neither initiates a call within a specified amount of time (as determined by the time-out-timer), TOT input line 557 of each unit will go low and the controller of each unit will return to STATE 2. Simultaneously, D/V output line 437 of each unit is changed such that both mobile transceivers return to the data mode. TIMER output line 555 of each unit is again set high to initialize their time-out-timers. Synthesizer frequency data 408 of each unit is also changed such that mobile receivers 112 and 117 receive base transmit control channel Y.

16. If mobile transceiver 115 remains within range of base transmitter 140, high speed data detector 520 of transceiver 115 will recognize the presence of the background data word received on control channel Y. This SPI signal will cause controller 500 of mobile transceiver 115 to advance either to STATE 3 (if reference oscillator 409 has not drifted outside the acceptable "ON" window), or to STATE 1 (if reference oscillator 409 has drifted outside this window.)

17. In the event that mobile transceiver 115 is no longer within the range of base transmitter 140, high speed data detector 520 of mobile transceiver 115 will not recognize the presence of the background data word. After an appropriate amount of time, as determined by the time-out-timer, TOT input line 557 of transceiver 115 will go low and controller 500 will advance to STATE 0. Simultaneouly, output HOLD line 532 and S/F output line 541 will be changed such that VCO control voltage 410 is swept at the faster rate as it was on power-up.

In review, an SSB communication system with FM data capability has been described to provide more efficient use of the 800 MHz land mobile radio spectrum. The base station transceiver transmits voice signals via SSB-AM in a specified voice channel, and transmits high speed data signals via narrowband FM in a specified data channel having a bandwidth no wider than that of the voice channel. Each remote station transceiver of the system includes a dual-mode receiver capable of receiving either the SSB-AM voice signals or the high speed FM data signals in response to information derived from the high speed data signals. Depending on the system configuration, the voice and data signals may be assigned to different channels, or may be assigned to the same channel.

While only particular embodiments of the invention have been shown and described herein, it will be obvious that certain modifications may be made without departing from the invention in its broader aspects and, accordingly, the appended claims are intended to cover all such changes and alternative constructions that fall with the true scope and spirit of the invention.

APPENDIX A
NEXT STATE Table
BINARY INPUT CODE
(RESET, EOT, TOT, CALL, PTT, SPI, ON)

| | | | | | | | | | | | | | | | | |
|---|---|---|---|---|---|---|---|---|---|---|---|---|---|---|---|---|
| PRESENT STATE 0 | 0 | 0 | 1 | 3 | 0 | 0 | 4 | 5 | 0 | 0 | 6 | 7 | 0 | 0 | 6 | 7 |
| | 0 | 0 | 1 | 3 | 0 | 0 | 4 | 5 | 0 | 0 | 6 | 7 | 0 | 0 | 6 | 7 |
| | 0 | 0 | 1 | 3 | 0 | 0 | 4 | 5 | 0 | 0 | 6 | 7 | 0 | 0 | 6 | 7 |
| | 0 | 0 | 1 | 3 | 0 | 0 | 4 | 5 | 0 | 0 | 6 | 7 | 0 | 0 | 6 | 7 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 1 | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 2 | 0 | 0 | 1 | 3 | 0 | 0 | 4 | 5 | 0 | 0 | 6 | 7 | 0 | 0 | 6 | 7 |
| | 2 | 2 | 1 | 3 | 2 | 2 | 4 | 5 | 2 | 2 | 6 | 7 | 2 | 2 | 6 | 7 |
| | 0 | 0 | 1 | 3 | 0 | 0 | 4 | 5 | 0 | 0 | 6 | 7 | 0 | 0 | 6 | 7 |
| | 2 | 2 | 1 | 3 | 2 | 2 | 4 | 5 | 2 | 2 | 6 | 7 | 2 | 2 | 6 | 7 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 3 | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 2 | 2 | 1 | 3 | 2 | 2 | 4 | 5 | 2 | 2 | 6 | 7 | 2 | 2 | 6 | 7 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 4 | 2 | 2 | 1 | 3 | 2 | 2 | 4 | 5 | 2 | 2 | 6 | 7 | 2 | 2 | 4 | 5 |
| | 2 | 2 | 1 | 3 | 2 | 2 | 4 | 5 | 2 | 2 | 6 | 7 | 2 | 2 | 4 | 5 |
| | 2 | 2 | 1 | 3 | 2 | 2 | 4 | 5 | 2 | 2 | 6 | 7 | 2 | 2 | 4 | 5 |
| | 2 | 2 | 1 | 3 | 2 | 2 | 4 | 5 | 2 | 2 | 6 | 7 | 2 | 2 | 4 | 5 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 5 | 11 | 11 | 11 | 11 | 5 | 5 | 5 | 5 | 11 | 11 | 11 | 11 | 5 | 5 | 5 | 5 |
| | 11 | 11 | 11 | 11 | 5 | 5 | 5 | 5 | 11 | 11 | 11 | 11 | 5 | 5 | 5 | 5 |
| | 11 | 11 | 11 | 11 | 5 | 5 | 5 | 5 | 11 | 11 | 11 | 11 | 5 | 5 | 5 | 5 |
| | 11 | 11 | 11 | 11 | 5 | 5 | 5 | 5 | 11 | 11 | 11 | 11 | 5 | 5 | 5 | 5 |
| | 11 | 11 | 11 | 11 | 5 | 5 | 5 | 5 | 11 | 11 | 11 | 11 | 5 | 5 | 5 | 5 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 6 | 2 | 2 | 1 | 3 | 2 | 2 | 1 | 3 | 2 | 2 | 6 | 7 | 2 | 2 | 6 | 7 |
| | 2 | 2 | 1 | 3 | 2 | 2 | 1 | 3 | 2 | 2 | 6 | 7 | 2 | 2 | 6 | 7 |
| | 2 | 2 | 1 | 3 | 2 | 2 | 1 | 3 | 2 | 2 | 6 | 7 | 2 | 2 | 6 | 7 |
| | 2 | 2 | 1 | 3 | 2 | 2 | 1 | 3 | 2 | 2 | 6 | 7 | 2 | 2 | 6 | 7 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 7 | 2 | 2 | 9 | 10 | 2 | 2 | 9 | 10 | 2 | 2 | 9 | 10 | 2 | 2 | 9 | 10 |
| | 7 | 7 | 9 | 10 | 7 | 7 | 9 | 10 | 7 | 7 | 9 | 10 | 7 | 7 | 9 | 10 |
| | 2 | 2 | 9 | 10 | 2 | 2 | 9 | 10 | 2 | 2 | 9 | 10 | 2 | 2 | 9 | 10 |
| | 7 | 7 | 9 | 10 | 7 | 7 | 9 | 10 | 7 | 7 | 9 | 10 | 7 | 7 | 9 | 10 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 8 | 2 | 2 | 9 | 10 | 5 | 5 | 9 | 10 | 2 | 2 | 9 | 10 | 5 | 5 | 9 | 10 |
| | 8 | 8 | 9 | 10 | 5 | 5 | 9 | 10 | 8 | 8 | 9 | 10 | 5 | 5 | 9 | 10 |
| | 2 | 2 | 9 | 10 | 5 | 5 | 9 | 10 | 2 | 2 | 9 | 10 | 5 | 5 | 9 | 10 |
| | 8 | 8 | 9 | 10 | 5 | 5 | 9 | 10 | 8 | 8 | 9 | 10 | 5 | 5 | 9 | 10 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |

APPENDIX A
NEXT STATE Table
BINARY INPUT CODE
(RESET, EOT, TOT, CALL, PTT, SPI, ON)

| PRESENT STATE 9 | 8 | 8 | 9 | 10 | 8 | 8 | 9 | 10 | 8 | 8 | 9 | 10 | 8 | 8 | 9 | 10 |
|---|---|---|---|---|---|---|---|---|---|---|---|---|---|---|---|---|
| | 8 | 8 | 9 | 10 | 8 | 8 | 9 | 10 | 8 | 8 | 9 | 10 | 8 | 8 | 9 | 10 |
| | 8 | 8 | 9 | 10 | 8 | 8 | 9 | 10 | 8 | 8 | 9 | 10 | 8 | 8 | 9 | 10 |
| | 8 | 8 | 9 | 10 | 8 | 8 | 9 | 10 | 8 | 8 | 9 | 10 | 8 | 8 | 9 | 10 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 10 | 8 | 8 | 9 | 10 | 8 | 8 | 9 | 10 | 8 | 8 | 9 | 10 | 8 | 8 | 9 | 10 |
| | 8 | 8 | 9 | 10 | 8 | 8 | 9 | 10 | 8 | 8 | 9 | 10 | 8 | 8 | 9 | 10 |
| | 8 | 8 | 9 | 10 | 8 | 8 | 9 | 10 | 8 | 8 | 9 | 10 | 8 | 8 | 9 | 10 |
| | 8 | 8 | 9 | 10 | 8 | 8 | 9 | 10 | 8 | 8 | 9 | 10 | 8 | 8 | 9 | 10 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| PRESENT STATE 11 | 8 | 8 | 8 | 8 | 8 | 8 | 8 | 8 | 8 | 8 | 8 | 8 | 8 | 8 | 8 | 8 |
| | 8 | 8 | 8 | 8 | 8 | 8 | 8 | 8 | 8 | 8 | 8 | 8 | 8 | 8 | 8 | 8 |
| | 11 | 11 | 11 | 11 | 11 | 11 | 11 | 11 | 11 | 11 | 11 | 11 | 11 | 11 | 11 | 11 |
| | 11 | 11 | 11 | 11 | 11 | 11 | 11 | 11 | 11 | 11 | 11 | 11 | 11 | 11 | 11 | 11 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |

APPENDIX B
OUTPUT CODE TABLE
HEX OUTPUT CODE--A+T,BEEP,~MUTE,HOLD,TIMER,S/F,T/R,V/D
BINARY INPUT CODE
(RESET,EOT,TOT,CALL,PTT,SPI,ON)

| PRESENT STATE 0 | 00 | 00 | 04 | 14 | 40 | 40 | 04 | 17 | 00 | 00 | 04 | 1D | 40 | 40 | 44 | 5D |
|---|---|---|---|---|---|---|---|---|---|---|---|---|---|---|---|---|
| | 00 | 00 | 04 | 14 | 40 | 40 | 04 | 17 | 00 | 00 | 04 | 1D | 40 | 40 | 44 | 5D |
| | 00 | 00 | 04 | 14 | 40 | 40 | 04 | 17 | 00 | 00 | 04 | 1D | 40 | 40 | 44 | 5D |
| | 00 | 00 | 04 | 14 | 40 | 40 | 04 | 17 | 00 | 00 | 04 | 1D | 40 | 40 | 44 | 5D |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT STATE 1 | 0C | 0C | 04 | 14 | 0C | 0C | 04 | 17 | 0C | 0C | 04 | 1D | 4C | 4C | 44 | 5D |
| | 0C | 0C | 04 | 14 | 0C | 0C | 04 | 17 | 0C | 0C | 04 | 1D | 4C | 4C | 44 | 5D |
| | 0C | 0C | 04 | 14 | 0C | 0C | 04 | 17 | 0C | 0C | 04 | 1D | 4C | 4C | 44 | 5D |
| | 0C | 0C | 04 | 14 | 0C | 0C | 04 | 17 | 0C | 0C | 04 | 1D | 4C | 4C | 44 | 5D |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT STATE 2 | 00 | 00 | 04 | 14 | 40 | 40 | 04 | 17 | 00 | 00 | 04 | 1D | 40 | 40 | 44 | 5D |
| | 04 | 04 | 04 | 14 | 44 | 44 | 04 | 17 | 04 | 04 | 04 | 1D | 44 | 44 | 44 | 5D |
| | 00 | 00 | 04 | 14 | 40 | 40 | 04 | 17 | 00 | 00 | 04 | 1D | 40 | 40 | 44 | 5D |
| | 04 | 04 | 04 | 14 | 44 | 44 | 04 | 17 | 04 | 04 | 04 | 1D | 44 | 44 | 44 | 5D |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT STATE 3 | 0C | 0C | 04 | 14 | 4C | 4C | 04 | 17 | 0C | 0C | 04 | 1D | 48 | 48 | 44 | 5D |
| | 0C | 0C | 04 | 14 | 4C | 4C | 04 | 17 | 0C | 0C | 04 | 1D | 48 | 48 | 44 | 5D |
| | 0C | 0C | 04 | 14 | 4C | 4C | 04 | 17 | 0C | 0C | 04 | 1D | 48 | 48 | 44 | 5D |
| | 0C | 0C | 04 | 14 | 4C | 4C | 04 | 17 | 0C | 0C | 04 | 1D | 48 | 48 | 44 | 5D |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT STATE 4 | 4C | 4C | 04 | 14 | 4C | 4C | 04 | 17 | 4C | 4C | 04 | 1D | 4C | 4C | 04 | 17 |
| | 4C | 4C | 04 | 14 | 4C | 4C | 04 | 17 | 4C | 4C | 04 | 1D | 4C | 4C | 04 | 17 |
| | 4C | 4C | 04 | 14 | 4C | 4C | 04 | 17 | 4C | 4C | 04 | 1D | 4C | 4C | 04 | 17 |
| | 4C | 4C | 04 | 14 | 4C | 4C | 04 | 17 | 4C | 4C | 04 | 1D | 4C | 4C | 04 | 17 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT STATE 5 | 17 | 17 | 17 | 17 | 97 | 97 | 97 | 97 | 17 | 17 | 17 | 17 | 97 | 97 | 97 | 97 |
| | 17 | 17 | 17 | 17 | 97 | 97 | 97 | 97 | 17 | 17 | 17 | 17 | 97 | 97 | 97 | 97 |
| | 17 | 17 | 17 | 17 | 97 | 97 | 97 | 97 | 17 | 17 | 17 | 17 | 97 | 97 | 97 | 97 |
| | 17 | 17 | 17 | 17 | 97 | 97 | 97 | 97 | 17 | 17 | 17 | 17 | 97 | 97 | 97 | 97 |

-continued

APPENDIX B
OUTPUT CODE TABLE
HEX OUTPUT CODE—A+T,BEEP,~MUTE,HOLD,TIMER,S/F,T/R,V/D
BINARY INPUT CODE
(RESET,EOT,TOT,CALL,PTT,SPI,ON)

|  | | | | | | | | | | | | | | | | |
|---|---|---|---|---|---|---|---|---|---|---|---|---|---|---|---|---|
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 0C | 0C | 04 | 14 | 4C | 4C | 04 | 04 | 0C | 0C | 04 | 1D | 4C | 4C | 44 | 5D |
| STATE | 0C | 0C | 04 | 14 | 4C | 4C | 04 | 04 | 0C | 0C | 04 | 1D | 4C | 4C | 44 | 5D |
| 6 | 0C | 0C | 04 | 14 | 4C | 4C | 04 | 04 | 0C | 0C | 04 | 1D | 4C | 4C | 44 | 5D |
| | 0C | 0C | 04 | 14 | 4C | 4C | 04 | 04 | 0C | 0C | 04 | 1D | 4C | 4C | 44 | 5D |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 1C | 1C | 25 | 35 | 5C | 5C | 65 | 75 | 1C | 1C | 25 | 35 | 5C | 5C | 65 | 75 |
| STATE | 15 | 15 | 25 | 35 | 55 | 55 | 65 | 75 | 15 | 15 | 25 | 35 | 55 | 55 | 65 | 75 |
| 7 | 1C | 1C | 25 | 35 | 5C | 5C | 65 | 75 | 1C | 1C | 25 | 35 | 5C | 5C | 65 | 75 |
| | 15 | 15 | 25 | 35 | 55 | 55 | 65 | 75 | 15 | 15 | 25 | 35 | 55 | 55 | 65 | 75 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 1C | 1C | 25 | 35 | 17 | 17 | 65 | 75 | 1C | 1C | 25 | 35 | 17 | 17 | 65 | 75 |
| STATE | 15 | 15 | 25 | 35 | 17 | 17 | 65 | 75 | 15 | 15 | 25 | 35 | 17 | 17 | 65 | 75 |
| 8 | 1C | 1C | 25 | 35 | 17 | 17 | 65 | 75 | 1C | 1C | 25 | 35 | 17 | 17 | 65 | 75 |
| | 15 | 15 | 25 | 35 | 17 | 17 | 65 | 75 | 15 | 15 | 25 | 35 | 17 | 17 | 65 | 75 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 1D | 1D | 25 | 35 | 1D | 1D | 65 | 75 | 1D | 1D | 25 | 35 | 1D | 1D | 65 | 75 |
| STATE | 1D | 1D | 25 | 35 | 1D | 1D | 65 | 75 | 1D | 1D | 25 | 35 | 1D | 1D | 65 | 75 |
| 9 | 1D | 1D | 25 | 35 | 1D | 1D | 65 | 75 | 1D | 1D | 25 | 35 | 1D | 1D | 65 | 75 |
| | 1D | 1D | 25 | 35 | 1D | 1D | 65 | 75 | 1D | 1D | 25 | 35 | 1D | 1D | 65 | 75 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 1D | 1D | 25 | 35 | 1D | 1D | 65 | 75 | 1D | 1D | 25 | 35 | 1D | 1D | 65 | 75 |
| STATE | 1D | 1D | 25 | 35 | 1D | 1D | 65 | 75 | 1D | 1D | 25 | 35 | 1D | 1D | 65 | 75 |
| 10 | 1D | 1D | 25 | 35 | 1D | 1D | 65 | 75 | 1D | 1D | 25 | 35 | 1D | 1D | 65 | 75 |
| | 1D | 1D | 25 | 35 | 1D | 1D | 65 | 75 | 1D | 1D | 25 | 35 | 1D | 1D | 65 | 75 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| PRESENT | 1F | 1F | 1F | 1F | 1F | 1F | 1F | 1F | 1F | 1F | 1F | 1F | 1F | 1F | 1F | 1F |
| STATE | 1F | 1F | 1F | 1F | 1F | 1F | 1F | 1F | 1F | 1F | 1F | 1F | 1F | 1F | 1F | 1F |
| 11 | 17 | 17 | 17 | 17 | 17 | 17 | 17 | 17 | 17 | 17 | 17 | 17 | 17 | 17 | 17 | 17 |
| | 17 | 17 | 17 | 17 | 17 | 17 | 17 | 17 | 17 | 17 | 17 | 17 | 17 | 17 | 17 | 17 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |
| | 00 | 00 | 00 | 00 | 00 | 00 | 00 | 00 | 00 | 00 | 00 | 00 | 00 | 00 | 00 | 00 |

What is claimed is:

1. A dual-mode remote radio station for use in a radio communication system, having a primary station and at least one remote station, said primary and remote stations capable of operating on a plurality of radio frequency channels, said remote station comprising:
   a receiver means for receiving signals including:
   means for selectively receiving one of either:
   (a) voice messages transmitted on a first type of modulation within a first channel of said plurality of channels, said first channel having a predetermined channel bandwidth; or
   (b) a first set of data messages carrying information from said primary station to said remote stations identifying said first channel of said plurality of channels, said first set of data messages transmitted continuously by a second type of modulation within a second channel of said plurality of channels, said second channel having a predetermined channel bandwidth being no wider than said first channel bandwidth; and
   control means for automatically controlling said receiver means such that said voice messages are received from said first channel in response to information derived from said first set of data messages received from said second channel.

2. The remote radio station according to claim 1, wherein said first type of modulation is amplitude modulation and wherein said second type of modulation is angle modulation.

3. The remote radio station according to claim 2, wherein said amplitude modulation is single sideband (SSB) amplitude modulation (AM).

4. The remote radio station according to claim 2, wherein said angle modulation is narrowband frequency modulation (FM).

5. The remote radio station according to claim 3, wherein said SSB-AM includes a reduced pilot carrier.

6. The remote radio station according to claim 3, wherein said voice messages are confined to a band of frequencies, and wherein said first radio channel includes an audio subcarrier located outside the voice frequency band.

7. The remote radio station according to claim 6, wherein said first radio channel includes a second set of data messages modulated on said audio subcarrier within said first channel bandwidth.

8. The remote radio station according to claim 7, wherein said controlling means controls said receiving means such that said first set of data messages is received from said second channel in response to information derived from said second set of data messages received from said first channel.

9. The remote radio station according to claim 2, wherein said receiving means includes means for selectively deriving an automatic frequency control (AFC) signal from one of said amplitude and angle types of modulation.

10. The remote radio station according to claim 1, wherein said first channel bandwidth is less than or equal to 7.5 kHz.

11. A dual-mode radio station for use in a radio communications system having a primary station and at least one remote station, said primary and remote stations capable of operating on a plurality of radio frequency channels, said remote station comprising:
a receiver including:
means for selectively receiving one of either:
(a) voice messages transmitted via a first type of modulation on a first radio frequency (RF) carrier within a first channel of said plurality of channels, said first channel having a predetermined channel bandwidth; and
(b) a first set of data messages carrying information from said primary station to said remote stations identifying said first channel of said plurality of channels, said first set of data messages continuously transmitted by a second type of modulation on a second RF carrier within a second channel of said plurality of channels, said second channel having a predetermined channel bandwidth being no wide than said first channel bandwidth; or
frequency generating means for providing a receiver injection signal to said receiving means, said frequency generating means having automatic frequency control (AFC) means for selectively deriving an AFC signal from one of said first and said second RF carriers.

12. The remote radio station according to claim 11, wherein said first type of modulation is amplitude modulation and wherein said second type of modulation is angle modulation.

13. The remote radio station according to claim 12, wherein said amplitude modulation is single sideband (SSB) amplitude modulation (AM).

14. The remote radio station according to claim 12, wherein said angle modulation is narrowband frequency modulation (FM).

15. The remote radio station according to claim 13, wherein said SSB-AM includes a reduced pilot carrier.

16. The radio communication system according to claim 12, wherein said receiving means includes means for selectively deriving an automatic frequency control (AFC) signal from one of said amplitude and angle types of modulation.

17. The remote station according to claim 11, wherein said first channel bandwidth is less than or equal to 7.5 kHz.

18. The remote radio station according to claim 11, wherein said first and second RF carriers occupy a single radio frequency channel at different times.

19. A dual-mode radio transceiver for use as a remote station in a radio communications system having a primary station and a plurality of remote stations, said primary and remote stations capable of transmitting and receiving voice and data signals over any one of a plurality of communications channels said radio transceiver comprising:
a receiver for receiving signals including:
means for receiving a first set of data messages from said primary station having information identifying a channel of a plurality of channels on which voice signals are carried, said data messages being transmitted continuously within a first channel of said plurality of channels, said first channel having a predetermined channel bandwidth;
and a transmitter means for transmitting signals including:
means for selectively transmitting one of either:
(a) voice messages via a first type of modulation within a second channel of said plurality of channels, said second channel having a channel bandwidth being no wider than said first channel bandwidth; or
(b) a second set of data messages having information identifying said second channel of said plurality of channels via a second type of modulation within a third channel of said plurality of channels, said third channel having a channel bandwidth being no wider than said first channel bandwidth; and
control means for automatically controlling said transmitting means such that said voice messages are transmitted on to the second channel in response to information derived from said first set of data messages received from said first channel.

20. The radio transceiver according to claim 19, wherein said first type of modulation is amplitude modulation and wherein said second type of modulation is angle modulation.

21. The radio transceiver according to claim 20, wherein said amplitude modulation is single sideband (SSB) amplitude modulation (AM).

22. The radio transceiver according to claim 20, wherein said angle modulation is narrowband frequency modulation (FM).

23. The radio transceiver according to claim 21, wherein said SSB-AM includes a reduced pilot carrier.

24. The radio transceiver according to claim 19, wherein said first channel bandwidth is less than or equal to 7.5 kHz.

25. The radio transceiver according to claim 19, wherein said first set of data messages are transmitted via narrowband frequency modulation.

26. A dual-mode radio receiver capable of receiving voice and data signals over any one of a plurality of radio frequency (RF) channels, said radio receiver comprising:
frequency generating means for generating a receiver injection signal in response to a channel selection signal and an automatic frequency control (AFC) signal;

control means for providing said channel selection signal to said frequency generating means;

means, responsive to said receiver injection signal, for receiving a first radio frequency (RF) carrier on a first RF channel having single sideband (SSB) amplitude modulation (AM);

means, responsive to said receiver injection signal, for receiving a second RF carrier on a second RF channel having narrowband frequency modulation (FM) with an order frequency; and AFC means for providing said AFC signal to said frequency generating means by tracking the frequency of one of said first and second RF carriers.

27. The radio receiver according to claim 26, wherein said first RF channel includes voice signals transmitted via SSB-AM with a reduced pilot carrier.

28. The radio receiver according to claim 26, wherein said second RF channel includes high speed data transmitted via narrowband FM without a pilot carrier.

29. The radio receiver according to claim 28, further including means for deriving information from said high speed data.

30. The radio receiver according to claim 26, wherein said first RF channel includes low speed data transmitted with said SSB-AM voice signals.

31. The radio receiver according to claim 30, further including means for deriving information from said low speed data to provide a receiver control signal.

32. The radio receiver according to claim 31, further including means for automatically selecting said second channel to be received by said radio receiver in response to said receiver control signal.

33. The radio receiver according to claim 26, wherein said first channel bandwidth is less than or equal to 7.5 kHz.

34. The radio receiver according to claim 26, wherein each of said plurality of RF channels have equal bandwidths.

35. The radio receiver according to claim 26, wherein said first and second RF carriers occupy a single radio frequency channel at different times.

36. The radio receiver according to claim 27, wherein said AFC means tracks said SSB-AM reduced pilot carrier whenever said radio receiver receives said first channel.

37. The radio receiver according to claim 28, wherein said AFC means tracks the approximate center frequency of said narrowband FM high speed data signals whenever said radio receiver receives said second channel.

38. The radio receiver according to claim 26, wherein said AFC means includes:

discriminator means for converting the frequency of said first and second RF carriers to provide first and second tracking voltages;

reference means for providing first and second reference voltages; and means for comparing said tracking voltages with said reference voltages to determine the frequency offset of said receiver.

39. The radio receiver according to claim 26, further including automatic gain control (AGC) means for controlling the gain of said receiver.

40. The radio receiver according to claim 39, wherein said AGC means is enabled whenever said radio receiver receives amplitude modulation, and wherein said AGC means is disabled whenever said radio receiver receives frequency modulation.

* * * * *

UNITED STATES PATENT AND TRADEMARK OFFICE
CERTIFICATE OF CORRECTION

PATENT NO. : 4,955,083
DATED : September 4, 1990
INVENTOR(S) : Sharon Phillips et al It is certified that error appears in the above-indentified patent and that said Letters Patent is hereby corrected as shown below:

Column 35, line 12, delete the word "order" and insert thereat —center—.

Signed and Sealed this

Twenty-seventh Day of June, 1995

Attest:

BRUCE LEHMAN

Attesting Officer

Commissioner of Patents and Trademarks